US 6,611,282 B1

(12) United States Patent
Trubko et al.

(10) Patent No.: US 6,611,282 B1
(45) Date of Patent: Aug. 26, 2003

(54) SUPER WIDE-ANGLE PANORAMIC IMAGING APPARATUS

(75) Inventors: Sergey Trubko, Floral Park, NY (US); Venkata N. Peri, Jersey City, NJ (US); Shree K. Nayar, New York, NY (US); James Korein, Chappaqua, NY (US)

(73) Assignee: Remote Reality, Westborough, MA (US)

( * ) Notice: Subject to any disclaimer, the term of this patent is extended or adjusted under 35 U.S.C. 154(b) by 0 days.

(21) Appl. No.: 09/477,415

(22) Filed: Jan. 4, 2000

Related U.S. Application Data
(60) Provisional application No. 60/114,702, filed on Jan. 4, 1999.

(51) Int. Cl.[7] .......................... H04N 7/00; G02B 23/00; G02B 17/00
(52) U.S. Cl. ....................................... 348/36
(58) Field of Search .................. 348/36, 37, 335, 348/373; 359/725, 366, 729, 859, 731; 434/44

(56) References Cited

U.S. PATENT DOCUMENTS

| | | | | |
|---|---|---|---|---|
| 3,505,465 | A | | 4/1970 | Rees .............................. 178/6 |
| 4,100,571 | A | * | 7/1978 | Dykes et al. .................. 348/37 |
| 4,297,723 | A | * | 10/1981 | Whitby ......................... 348/36 |
| 4,395,093 | A | | 7/1983 | Rosendahl .................... 350/441 |
| 4,484,801 | A | | 11/1984 | Cox ............................. 350/441 |
| 4,556,763 | A | | 12/1985 | Dragunevicius et al. .... 179/164 |
| 4,566,763 | A | * | 1/1986 | Greguss ........................ 359/725 |
| 5,185,667 | A | | 2/1993 | Zimmermann .............. 358/209 |
| 5,359,363 | A | | 10/1994 | Kuban et al. .................. 348/36 |
| 5,627,675 | A | * | 5/1997 | Davis et al. ................. 359/366 |
| 5,631,778 | A | | 5/1997 | Powell ......................... 359/724 |
| 5,760,826 | A | | 6/1998 | Nayar .......................... 348/36 |
| 6,118,474 | A | * | 9/2000 | Nayar .......................... 348/36 |
| 6,226,035 | B1 | * | 5/2001 | Korein et al. ................ 348/335 |
| 6,449,103 | B1 | * | 9/2002 | Charles ....................... 359/725 |

FOREIGN PATENT DOCUMENTS

WO  WO 97/50252  12/1997

OTHER PUBLICATIONS

Hall et al., "Omnidirectional viewing using a fish eye lens"; SPIE vol. 728 Optics, Illumination, and Image Sensing for Machine Vision (1986), pp. 250.
Drucker et al., "A Natural Classification of Curves and Surfaces With Reflection Properties"; Mathematics Magazine, vol. 69, No. 4, Oct. 1996, pp. 249–256.
V.N. Mahajan, Optical Imaging and Aberrations, SPIE Press, 1998, pp. 375.

(List continued on next page.)

Primary Examiner—Gims S. Philippe
(74) Attorney, Agent, or Firm—Katten Muchin Zavis Rosenman; Gilberto M. Villacorta; Andrew J. Bateman

(57) ABSTRACT

A system for capturing super wide-angle panoramic images. In particular, a two-reflector system is disclosed which is substantially self-correcting in which optical aberrations are substantially eliminated, such as field curvature, astigmatism and the like. Moreover, the super wide-angle panoramic imaging apparatus of the invention captures a super-wide field of view from a substantially single reference viewpoint. The invention provides a substantially compact viewpoint, while also having a substantially flat and stigmatic image plane, in the context of a super wide-angle panoramic system. Devices and methods for capturing panoramic images of super wide-angle scenes are provided. In a particular embodiment of the invention, two reflectors are provided (e.g., one a hyperboloidal mirror, the other a concave ellipsoidal or spherical mirror), a relay system (e.g., optics such as a mirror, a lens, a pinhole and the like) and an image sensor (e.g., an electronic photo-sensor, a film and the like).

40 Claims, 22 Drawing Sheets

OTHER PUBLICATIONS

Nayar, et al., "Catadioptric Image Formation"; Proc. of DARPA Image Understanding Workshop, New Orleans, May 1997.

Yamazawa, et al., "Omnidirectional Imaging with Hyperboloidal Projection"; Proceedings of the 1993 IEEE/RSJ International Conference on Intelligent Robots and Systems, Yokohama, Japan, Jul. 26–30, 1993.

Nayar, "Omnidirectional Video Camera"; Proc. of DARPA Image Understanding Workshop, New Orleans, May 1997.

* cited by examiner

SUPER WIDE-ANGLE PANORAMIC IMAGING APPARATUS

RELATED APPLICATIONS

This application claims priority to U.S. Provisional Application No. 60/114,702 filed Jan. 4, 1999, which is incorporated herein by reference.

1. FIELD OF THE INVENTION

This invention relates to panoramic image sensing of a super wide-angle field of view, and in particular, it relates to such image sensing using a two-mirror subsystem that is substantially self-corrected. The term "panoramic" means a 360° field of view in a horizontal plane while the term "super wide-angle" means a 120° or larger field of view in a vertical plane. Preferably, the field of view in a vertical plane is greater than about 1800. More preferably, it is greater than about 200°. And, for the desired apparatus, most preferably, it is greater than about 260°.

2. BACKGROUND OF THE INVENTION

A perspective imaging system collects rays of light from the scene that pass through a single point of reference and projects them onto a sensing element such as film or a charge coupled device (CCD). The single point of reference in the perspective imaging system is known as the viewpoint of the system. Yamazawa et al., "Omnidirectional Imaging with Hyperboloidal Projection", IEEE International Conference on Robotics and Automation, 1993, by Nalwa, "A True Omnidirectional Viewer", ATT Bell Laboratories Technical Memorandum, BL0115500-960115-01, January 1996 and by Nayar, "Omnidirectional Video Camera", DARPA Image Understanding Workshop, May 1997, all incorporated herein by reference, describe the need for a single viewpoint. We have determined that the nature of light propagation through the imaging system and the shape of imaging sensor may introduce geometric transformations in the image projected onto the sensing element. In a large number of applications including surveillance, remote sensing, navigation, model acquisition, virtual reality, computer vision and robotics, it is desirable that these geometric transformations be corrected for the purposes of viewing and analysis. The lack of a single viewpoint introduces aberrations in pupils which manifests itself as uncorrectable geometric transformations (distortions).

A classification of imaging systems based on their field of view is:
1. Traditional imaging systems that image a narrow field of view, usually an octant of the sphere of view (up to 90 degrees).
2. Panoramic imaging systems that image a panorama of the scene. The field of view can be looked upon as a sphere truncated by two parallel planes giving a 360 degree field of view in the horizontal and a limited field of view in the vertical.
3. Omnidirectional imaging systems that image substantially spherical or substantially hemispherical fields of view.

A classification of the same based on their optical components is:
1. Dioptric systems that use only refractive elements;
2. Catoptric systems that use only reflective elements; and
3. Catadioptric systems that use a combination of reflective and refractive elements.

Perhaps the simplest system that provides perspective projection is a pinhole camera. Traditionally, lenses have been used in place of a pinhole simply because of their superior light gathering ability. But a lens, however wide angle it may be, is limited to a hemispherical field of view while still maintaining a single viewpoint, although it is physically challenging to design such wide-angle lenses.

Lenses that deviate from maintaining a single viewpoint have been described by E. H. Hall et al., "Omnidirectional Viewing using a Fish Eye Lens", SPIE Vol. 728 Optics, Illumination and Image Sensing for Machine Vision, 1986, pp. 250, incorporated herein by reference. Such lenses have been known to achieve larger than hemispherical fields of view, up to 280 degrees in the vertical plane. However, these so-called fish eye lenses are significantly larger and more complex than conventional lenses, and suffer from severe geometric distortions and loss of resolution in the image over the field of view. Moreover, the lack of a single reference point for the rays of light imaged by the lens disqualifies their usage in a large number of applications, described above. U.S. Pat. No. 5,185,667 to Zimmerman and U.S. Pat. No. 5,359,363 to Kuban are descriptions of additional uses of fish eye lenses, all incorporated herein by reference. Thus, of the known dioptric systems, those that seek to preserve a single viewpoint are limited to a narrow field of view.

Using only reflective elements, catoptric imaging systems are the closest to ideal imaging systems. The lack of refractive elements removes the possibility of chromatic aberrations allowing these systems to operate under a wide range of illumination wavelengths. But the greatest advantage of catoptric systems is that the reflective elements can be matched to correct for almost all aberrations that plague imaging systems, including field curvature and spherical aberration in pupils. A disadvantage of such systems is their light gathering ability which requires them to operate with lower F-numbers.

Catadioptric systems have been known to span the entire gamut in terms of field of view, from omnidirectional to panoramic to traditional narrow fields of view. The simplest wide-angle catadioptric system comprises two optical components: a curved non-planar primary reflector placed in front of a objective lens. The complete class of mirror lens combinations that capture wide-angle views while maintaining a single viewpoint has been described by Nayar et al., "Catadioptric Image Formation", IEEE International Conference on Computer Vision, January 1998, incorporated herein by reference. Further, for a mirror to have a single viewpoint it is necessary that the mirror be a surface of revolution of a two dimensional curve. Daniel Drucker et al., "A Natural Classification of Curves and Surfaces With Reflection Properties", Mathematics Magazine, vol, 69, no. 4, pp. 249–256, 1996, incorporated herein by reference, have shown that the only two dimensional curves with focal properties are conic sections. Hence, the only mirrors that maintain a single viewpoint are conic sections of revolution. Further, those that can be realized in practice are paraboloids, hyperboloids and ellipsoids. It is worthwhile mentioning here that while the sphere is an intuitive solution it is impractical because the focus is at the center of the sphere, and so is the cone for the reason that the focus is at the apex of the cone.

A catadioptric omnidirectional imaging system has been described in U.S. Pat. No. 5,760,826 to Shree Nayar, incorporated herein by reference. The system uses a convex paraboloidal mirror, telecentric relay objective lens and a standard camera lens which projects an annular image of a substantially hemispherical scene captured from a single viewpoint onto a planar sensing device such as a CCD. A disadvantage of the system is that the use of an aspheric surface results in residual field curvature. This prevents its usage with a low F-number compact system.

A more complex catadioptric panoramic imaging system is one that uses two reflecting surfaces in conjunction with a relay objective lens. In such a system the primary reflector collects scene intensity information which is then reflected off a secondary reflector into the relay objective lens.

For the entire system to have a single viewpoint, while the primary mirror must have a single viewpoint (which is the viewpoint of the overall system) it is not necessary for the secondary mirror to have a single viewpoint. The tools for developing such systems of mirrors that have an overall single viewpoint have been described by Conbleet, "Microwave and Optical Ray Geometry", Published by John Wiley and Sons, 1984, incorporated herein by reference. It can be shown that a variety of mirror pairs, some with exotic shapes, can be used to construct catadioptric imaging systems of interest. However we have determined that mirrors with complex shapes produce confounding optical aberrations. Moreover, even seemingly simple surfaces such as quadrics (surfaces of revolution of planar 2nd order algebraic curves) can produce complex optical aberrations. In our investigation we have found that the only quadrics that can form optically acceptable two mirror systems are conic sections of revolutions, viz. paraboloids, ellipsoids and hyperboloids.

It is a well-known fact in geometry that, a property of conic sections (and hence mirrors formed from conic sections of revolution) is that rays of light in the direction of the one focus of a conic section are reflected by the conic to converge at the other focus of the conic section. Hence, we have determined that for a conic mirror pair to maintain a single overall viewpoint it is necessary the two conics be confocal, i.e., the far focus of the primary conic mirror coincides with the near focus of the secondary conic mirror (a special case is the parabola, where the common focus is at infinity). When the two mirrors are confocal, i.e., the system maintains a single reference viewpoint, the two mirror subsystem corrects for spherical aberration in pupils. The imaging system is made complete by positioning the entrance pupil of the relay objective lens at the far focus of the secondary conic.

Two-mirror panoramic imaging systems have been described at an internet web site maintained by Jeffrey Charles and in U.S. Pat. No. 4,484,801 to Cox. While these systems are panoramic in nature, none seek to preserve a single reference viewpoint, resulting in severe geometric distortion in the image captured off the primary reflector. This distortion manifests itself in the form of spherical aberration in pupils. The complexity of these systems lies in their relay objective lenses, which are required to compensate for such severe spherical aberrations. These systems also exhibit complex field curvature, by far the most difficult aberration to correct. As a result, these systems have high F-numbers resulting in additional complexity in the relay objective lenses. Jeffrey Charles' system has an F-number that ranges from 22 to 16. Cox's system contains a 12-component lens for field curvature correction.

Another example of similar panoramic systems is described in International Patent Application PCT/US97/09313 by Driscoll, et. al. The system uses a primary convex paraboloid reflector and a secondary planar reflector and hence exhibits severe astigmatism and field curvature, requiring additional astigmatism correction lenses and field flattening lenses. Additionally, the use of strong elements in the astigmatism correction lens introduces deleterious amounts of spherical aberration (lack of a single reference viewpoint) and coma into the final image.

Another example of a two-mirror catadioptric system is described in U.S. Pat. No. 3,505,465 to Rees. The system uses a convex hyperboloidal mirror as the primary reflector and a convex spherical mirror as the secondary reflector in conjunction with a complex relay objective lens. The use of two convex mirrors causes the system to exhibit severe field curvature, hence the need for a complex relay objective lens.

Another example of a two-mirror system is described in U.S. Pat. No. 4,566,763 to Greguss that uses two paraboloidal reflective surfaces, a refractive surface and a telecentric objective lens. It can be shown that such a confocal mirror subsystem with two paraboloids that seeks to preserve a single overall viewpoint must use a perspective objective relay lens, and hence the system described there does not preserve a single reference viewpoint.

U.S. Pat. No. 4,395,093 to Rosendahl and Dicks describes a two mirror system in which the primary reflector is a convex hyperboloid and the secondary reflector is a concave hyperboloid in conjunction with a complex objective lens that comprises 21 components. Since the two reflectors have very different radii of curvatures, the system exhibits severe field curvature, which is corrected in part by the complex objective lens.

U.S. Pat. No. 5,631,778 to Ian Powell describes a panoramic imaging system with two reflectors and a complex refractive objective lens. The primary reflector is a concave conic of revolution: either an ellipsoid, sphere or oblate spheroid. The secondary reflector is a convex conic of revolution, typically a hyperboloid although spheres have been used too. Since the primary mirror is concave, the field of view in the vertical plane is limited to 180°. An additional 10° is possible by adding a refractive negative shell in front of the entire arrangement. Investigation has shown that no effort was apparently made to make the two mirrors confocal and further, it is evident that the use of a sphere or oblate spheroid in conjunction with a hyperboloid, results in severe spherical aberration of pupils. Hence the system does not have a single viewpoint, indicating the need for a complex relay objective lens.

U.S. Pat. No. 5,627,675 to Davis et al. discloses a panoramic imaging system that employs as its primary collection subsystem two elements that comprise a Mersenne optic; the first element being a convex paraboloidal reflector and the second element being a concave paraboloidal reflector. From the above discussion, such a system of paraboloidal mirrors comprises a confocal pair of conic section mirrors which preserves a single reference viewpoint, thus eliminating to a large degree aberration in pupils. However, for any field correction to occur in the two mirror subsystem, the two mirrors must have the same radii of curvature. Doing so severely restricts the field of view due to vignetting of the scene by the secondary reflector, typically to less than 45 degrees above and below the horizon.

To summarize, the catadioptric panoramic imaging systems known in the art all have shortcomings. Most systems do not have a single reference viewpoint for the imaging system. This results in severe spherical aberration in pupils that manifests itself as uncorrectable geometric distortion in the captured image. Those systems that do maintain a single viewpoint are limited either in their ability to perform under varying light conditions and F-numbers due to significant field curvature that remains uncorrected, or in their vertical field of view due to vignetting by optical components. Further, the use of objective lenses for correcting above mentioned spherical aberration and field curvature results in chromatic aberrations. Furthermore, these objective lenses tend to be highly complex and expensive.

The shortcomings of the above-mentioned state of the art are substantially remedied by the invention disclosed here. The patents and publications referenced above do not teach the panoramic imaging apparatus and method disclosed here.

3. SUMMARY OF THE INVENTION

One aspect of the invention is a panoramic imaging apparatus with a super wide field of view for imaging a scene, comprising:
  a. an image sensor positioned to receive said super wide field of view;
  b. a two reflector sub-system that is substantially self corrected, said subsystem comprising:
     i. a primary truncated reflector positioned to reflect an image of said substantially super wide-angle scene,
     ii. a secondary truncated reflector optically coupled with said primary reflector, said secondary truncated reflector positioned to reflect said image reflected by said primary reflector;
wherein said primary and secondary reflectors have shapes and sizes to substantially correct field curvature of the image projected on said image sensor; and
  c. a relay system, optically coupled to said secondary reflector, for substantially filtering out principle rays that are not reflected by said secondary reflector.

In an exemplary embodiment, the two mirrors have shapes and sizes to capture the super wide-angle scene from a single reference viewpoint.

A super wide-angle field of view, for the purpose of this invention, comprises a field of view greater than or equal to 120 degrees. That is, it constitutes a cone which extends at least 60 degrees from the optical axis. There may exist a blind spot in the immediate vicinity of the optical axis. Preferably, the super wide-angle field of view of the present invention includes a panoramic field of view greater than or equal to 180 degrees, more preferably greater than or equal to 200 degrees. In selected embodiments of the invention, the field of view may be greater than or equal to 220 degrees.

In an exemplary embodiment of an apparatus according to the present invention, the primary reflector is convex. In another exemplary arrangement, the primary reflector is concave.

In yet another exemplary embodiment, the surface of the primary reflector is a conic of revolution that obeys the following equation, $$r^2 = 2R_1 z - (1+k_1) z^2. \tag{1}$$

Since the reflector has axial symmetry, equation (1) also represents a cross section of the reflector r is the radial coordinate, i.e., $r^2 = x^2 + y^2$, and z is the coordinate along the optical axis Z. $R_1$ is the radius of curvature of the conic that forms the reflector and $k_1$ is its conic constant. For $k_1 < -1$, the reflector is a hyperboloid of revolution, for $k_1 = -1$, a paraboloid, for $-1 < k_1 \leq 0$. Note that for the special case of $k_1 = 0$, the primary reflector is a sphere.

The reflector is truncated in a plane that is perpendicular to the optical axis, Z, such that the desired field of view is imaged by the reflector.

A hole, having a selected diameter, is created at the vertex (apex) of the reflector to create an optical path through which light reflected off the secondary reflector can pass without substantial vignetting. The hole serves the additional purpose of discarding rays of light that are reflected by the primary reflector such that they do not substantially pass through the single viewpoint of the imaging system.

In another exemplary arrangement, the primary reflector is a higher order (>2, e.g., 14) surface of revolution.

In an exemplary embodiment of an apparatus according to the present invention, the secondary reflector is concave. In an alternative arrangement, the secondary reflector is convex.

In yet another exemplary embodiment, the secondary reflector is in the form of a conic of revolution. The secondary reflector is preferably positioned along an optical axis, which coincides with the optical axis, Z, of the primary reflector. The surface of the secondary reflector obeys the following equation, $$r^2 = 2R_2 z - (1+k_2) z^2, \tag{2}$$

where once again, due to axial symmetry, equation (2) also represents a cross section of the reflector wherein r is the radial coordinate and z is the coordinate along the optical axis, Z. $R_2$ is the radius of curvature of the conic that forms the secondary reflector and $k_2$ is its conic constant. For $k_2 < -1$, the reflector is a hyperboloid of revolution, for $k_2 = -1$, a paraboloid, for $-1 < k_2 < 0$, an ellipsoid. Note that for the special case of $k_2 = 0$, the secondary reflector is a sphere.

The reflector is truncated in a plane that is perpendicular to the optical axis, Z, such that light reflected off the primary reflector is imaged by the secondary reflector.

In another exemplary arrangement, the secondary reflector is a higher order (>2, e.g., 14) surface of revolution.

In an exemplary embodiment, the distance between the apexes of the two reflectors substantially obeys the following equation:

$$d_1 = \frac{2R_1 \sqrt{-k_1}}{|1+k_1|} + \frac{R_2}{1+\sqrt{-k_2}} - \frac{R}{1+\sqrt{-k_1}}. \tag{3}$$

In an exemplary embodiment, the relay system is preferably positioned along an optical axis, which coincides with the common optical axis, Z, of the primary and secondary reflectors, such that the primary reflector is located physically between the relay system and the secondary reflector. The relay system is an optical component used to project an image to another location, i.e., it is a means for relaying the image to the sensor.

In another exemplary arrangement, the relay system is a simple aperture, as in a pin-hole camera.

In another exemplary arrangement, the relay system comprises at least one lens. The lens may be made of a plurality of portions of optical material that are cemented together, such as a doublet.

In an exemplary embodiment, the distance between the vertex of the primary reflector and the entrance pupil of the relay system substantially obeys the equation:

$$d_2 = \frac{2R_2 \sqrt{-k_2}}{|1+k_2|} + \frac{R_1}{1+\sqrt{-k_1}} - \frac{2R_1 \sqrt{-k_1}}{|1+k_1|}. \tag{4}$$

In an exemplary arrangement, the image sensor is electronic, such as a charge coupled device (CCD) or a complementary metal oxide semiconductor sensor (CMOS) and provides an electronic signal that is representative of the image projected onto the image sensor. This image signal is digitized and transferred to an image storage apparatus. The digitized image can then be transferred to an image processing apparatus. In another exemplary arrangement, the digitized signal is transferred directly to an image processing apparatus, without using an intermediate storage apparatus.

In yet another exemplary arrangement, the image sensor is photographic film, the image of which can be subsequently digitized and the resulting signal then transferred to the imaging processing apparatus. The imaging processing apparatus is advantageously adapted to enable viewing of any portion of the super wide-angle scene.

Another aspect of the present invention is a two mirror system that substantially eliminates to a very large extent, aberrations that occur in panoramic optical systems, allowing for the creation of an image of high optical quality, said system comprising:

a. a primary reflector that constitutes the first mirror, and
  b. a secondary reflector that constitutes the second mirror, the shape and size of which is carefully matched to the shape and size of said primary reflector.

To minimize field curvature in an optical system, the Petzval curvature of the system must be close to zero. While this corrects third order field curvature, higher orders of the field curvature can be corrected by optimizing optical powers of the optical components. The result is a diffraction-limited system with highest possible image quality.

Yet another aspect of the present invention is a two mirror subsystem that substantially reduces the cost of manufacturing a commercial super wide-angle panoramic imaging apparatus, and increases versatility of use, said subsystem comprising:

a. a primary reflector that constitutes the first mirror, and
  b. a secondary reflector that constitutes the second mirror, the shape and size of the two mirrors chosen to minimize field curvature introduced by the two mirror subsystem.

It is known that in systems with field curvature, a non-trivial array of lenses is required to offset the negative effects of field curvature, this array increasing the cost of the system. Additionally, field curvature correcting lenses or field flatteners are typically introduced in close proximity to the image sensor, reducing the versatility of the system with respect to use with standard, off-the-shelf components.

Another aspect of the present invention is a panoramic imaging apparatus that senses a super wide-angle scene from a single reference viewpoint. In an exemplary embodiment, the reference viewpoint is a locus of points that lie within a sphere of radius of no more than 4 mm.

The present invention also provides a method for sensing an image of super wide-angle scene, which in an exemplary embodiment of the present invention, comprises the following steps:

a) reflecting an image of the super wide-angle field of view on a primary reflector (described above) such that the single viewpoint substantially coincides with the near focus of the conic section that forms the primary reflector,
  b) reflecting the image reflected in step (a) on a secondary reflector (described above) such that the rays of light reflected by the secondary reflector pass through the hole on the primary reflector,
  c) propagating the rays of light from step (b) through a relay system and
  d) sensing the rays of light propagated through the relay system in step (c).

The present invention also includes, in another exemplary embodiment of the imaging method, the further steps of:

1. providing an image signal which is representative of the image projected onto the image sensor,
  2. converting the image signal to image data, mapping the image data into a Cartesian-coordinate system, and
  3. interpolating the image data and forming a digital image from the mapped image data and the interpolated image data.

Another aspect of the present invention is a two mirror panoramic system that is substantially scalable, in that the size of all components and their relative positions can be scaled without significant loss of image quality.

4. BRIEF DESCRIPTION OF THE DRAWINGS

FIG. 1 A sectional view depicting a first exemplary arrangement with a primary hyperboloidal mirror, a secondary ellipsoidal mirror, a pinhole relay lens, and a 200 degree field of view.

FIG. 2 Depiction of Field curvature (FIG. 2a) and distortion graphs (FIG. 2b) for the arrangement of FIG. 1.

FIG. 3 Depiction of a Modulation Transfer Function graph for the arrangement of FIG. 1.

FIG. 4 A sectional view depicting a second exemplary arrangement with a primary hyperboloidal mirror, a secondary spherical mirror, a pinhole relay and a 200 degree field of view.

FIG. 5 Depiction of Field curvature (FIG. 5a) and distortion graphs (FIG. 5b) for the arrangement of FIG. 4.

FIG. 6 Depiction of a Modulation Transfer Function graph for the arrangement of FIG. 4.

FIG. 7 A sectional view depicting a third exemplary arrangement with a primary hyperboloidal mirror, a secondary spherical mirror, a pinhole relay and a 220 degree field of view.

FIG. 8 Depiction of Field curvature (FIG. 8a) and distortion graphs (FIG. 8b) for the arrangement of FIG. 7.

FIG. 9 Depiction of a Modulation Transfer Function graph for the arrangement of FIG. 7.

FIG. 10 A sectional view depicting a fourth exemplary arrangement with a primary hyperboloidal mirror, a secondary ellipsoidal mirror, a pinhole relay lens, and a 260 degree field of view.

FIG. 11 Depiction of Field curvature (FIG. 11a) and distortion graphs (FIG. 11b) for the arrangement of FIG. 10.

FIG. 12 Depiction of a Modulation Transfer Function graph for the arrangement of FIG. 10.

FIG. 13 A sectional view depicting a fifth exemplary arrangement with a double-Gauss relay objective lens.

FIG. 14 A sectional view depicting a sixth exemplary arrangement of an opto-mechanical implementation made from a single block of optical material.

FIG. 15 A sectional view depicting a seventh exemplary arrangement of an opto-mechanical implementation that uses a protective transparent dome.

FIG. 16 A sectional view of the path of a principal ray of light in a confocal two-mirror system, in accordance with the invention, in which the primary mirror is a hyperboloid and the secondary mirror is an ellipsoid.

FIG. 17 Illustration of an optical layout of a Miniaturized Ruggedized Paracamera.

FIG. 18 Illustration of a sectional view of the Miniaturized Ruggedized Paracamera with ray tracing.

FIG. 19 Illustration of a sectional view of the Miniaturized Ruggedized Paracamera with groove, and top and bottom pins to prevent ghost images and ambient light.

5. DETAILED DESCRIPTION OF THE PREFERRED EMBODIMENTS

Figure 1:
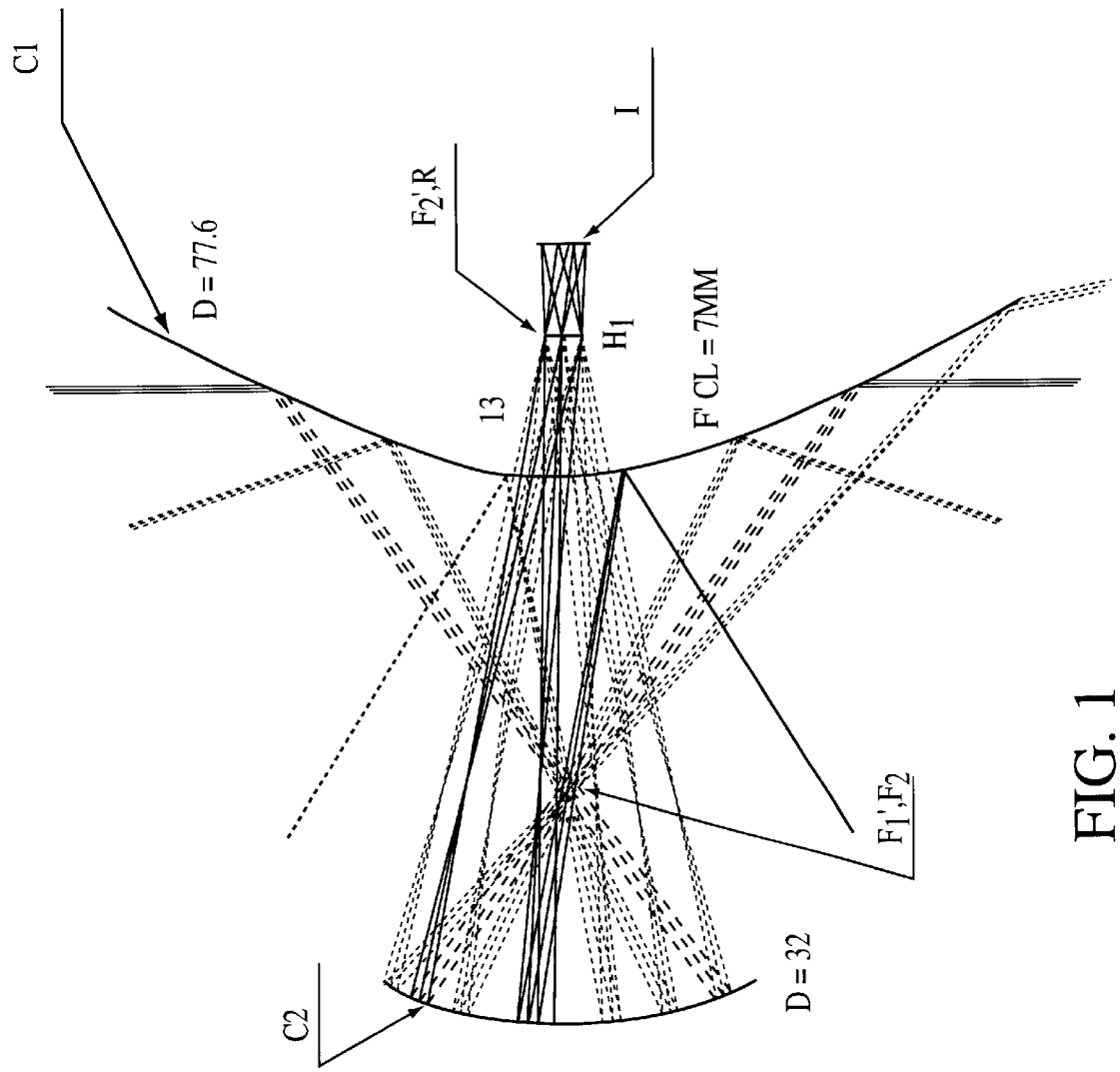

A panoramic imaging apparatus for sensing a super wide-angle field of view is provided by the present invention. The apparatus comprises: (a) a pair of reflectors, including (i) a primary reflector having a first shape and a first size and capable of providing a first reflection of a super wide-angle scene, and (ii) a secondary reflector having a second shape and a second size, which is positioned to accept the first reflection to provide a second reflection at a first location, the shapes and sizes of the primary and secondary reflectors, and their respective positions, are such that the second reflection provided at the first location is substantially free of field curvature effects and astigmatic effects; (b) a relay system comprising optics capable of relocating the second reflection to a second location to provide a relocated reflection; and (c) an image sensor positioned to accept the relocated reflection at the second location, in which the panoramic imaging apparatus captures the super wide-angle scene from a substantially single reference viewpoint.

In a particular embodiment of the invention, the panoramic imaging apparatus is equipped with a relay system that includes optics capable of substantially filtering out optical rays other than those reflected directly by the secondary reflector from incoming optical rays reflected directly by the first reflector. Moreover, in one embodiment the second reflection is substantially flat and stigmatic. In a preferred embodiment the primary reflector is convex and the secondary reflector is concave. More preferably, the primary reflector is substantially hyperboloid and the secondary reflector is substantially ellipsoid.

Thus, an alternative embodiment of the present invention includes a panoramic imaging apparatus for sensing a super wide-angle field of view comprising: (a) a pair of reflectors, including (i) a primary reflector having a first shape and a first size and capable of providing a first reflection of a super wide-angle scene, and (ii) a secondary reflector having a second shape and a second size, which is positioned to accept the first reflection to provide a second reflection at a first location, the shapes and sizes of the primary and secondary reflectors, and their respective positions, are such that the second reflection provided at the first location is substantially free of field curvature effects and astigmatic effects; (b) a relay system positioned to accept the second reflection and comprising optics capable of substantially filtering out optical rays other than those reflected directly by the secondary reflector from incoming optical rays reflected directly by the first reflector to provide a filtered reflection; and (c) an image sensor positioned to accept the filtered reflection, in which the panoramic imaging apparatus captures the super wide-angle scene from a substantially single reference viewpoint. Preferably, the alternative embodiment is equipped with a relay system that includes optics capable of relocating a reflection (any reflection, e.g., a second reflection or a filtered reflection) at a first location to a second location to provide a relocated reflection.

The image sensor may comprise any suitable sensor, including but not limited to photographic film, a CCD image sensor, a CMOS image sensor, a video camera and the like. Also, the relay system is positioned such that the primary reflector is between the secondary reflector and the relay system. The relay system may comprise any suitable relay including but not limited to a pinhole, at least one lens, at least one mirror and the like.

In a preferred embodiment of the invention the primary reflector comprises a substantially hyperboloidal mirror having a surface that substantially obeys the equation expressed in cylindrical coordinates, $r^2=2R_1z-(1+k_1)z^2$, where z is the coordinate along the optical axis, r is the radial coordinate, $R_1$ is the radius of curvature at the vertex of the conic that forms the primary reflector and $k_1$ is the conic constant of the primary reflector, and the secondary reflector comprises a substantially ellipsoidal or spherical mirror having a surface which substantially obeys the equation expressed in cylindrical coordinates, $r^2=2R_2z-(1+k_2)z^2$, where z is the coordinate along the optical axis, r is the radial coordinate, $R_2$ is the radius of curvature at the vertex of the conic that forms the secondary reflector and $k_2$ is the conic constant of the secondary reflector. In addition the primary reflector has an axis of rotation, comprises a mirror truncated at a plane that is substantially perpendicular to the axis of rotation and further has a near focal point and a far focal point. Likewise, the secondary reflector has an axis of rotation, which is substantially coincident with the axis of rotation of the primary reflector, comprises a mirror truncated at a plane which is substantially perpendicular to the axis of rotation of the secondary reflector and further has a near focal point and a far focal point.

The configuration of the apparatus of the invention can be made such that a position of the near focal point of the secondary reflector is substantially coincident with a position of the far focal point of the primary reflector, and, optionally, the relay system is positioned along the axis of rotation of the primary reflector and the secondary reflector. If desired the image sensor is positioned along the axis of rotation of the primary reflector and the secondary reflector. The apparatus may further comprise a transparent mechanical support, which maintains the relative positions of the primary reflector, the secondary reflector, the relay system and the image sensor. In a particular embodiment, the image sensor provides an image signal representative of the relocated reflection and which apparatus further comprises an image signal processor that is coupled to the image sensor to convert the image signal into image signal data and to map the image signal data into a Cartesian coordinate system. The image signal processor may further include an interpolator for providing interpolated image data, such that the interpolated image data and the image signal are combined to form a digital image.

The panoramic imaging apparatus of the invention may be equipped with primary and secondary reflectors that include back reflective mirrored surfaces of a solid transparent optical block. Furthermore the transparent block has at least one hole or groove, which optionally has an axis that coincides with an optical axis of the primary and secondary reflectors.

The instant invention also contemplates a method of providing a substantially stigmatic reflection of a super wide-angle field of view captured from a substantially single reference viewpoint comprising: (a) providing a primary reflector to generate a first reflection of a super wide-angle scene, the primary reflector having a near focal point and a far focal point; (b) providing a secondary reflector to accept the first reflection and to generate a second reflection, the secondary reflector having a near focal point and a far focal point; (c) providing a relay system having an entrance pupil, in which the primary reflector, secondary reflector and lens are positioned such that the far focal point of the primary reflector coincides substantially with the near focal point of the secondary reflector and the entrance pupil of the relay system coincides substantially with the far focal point of the secondary reflector. In a preferred embodiment the rays of light of the second reflection pass through a hole in the primary reflector and meet substantially at a single point on the optical axis of the primary reflector. More preferably the method further comprises substantially filtering out optical rays other than those reflected directly by the secondary reflector from incoming optical rays reflected directly by the first reflector to provide a filtered reflection. Even more preferably, the method further comprises propagating the second reflection or the filtered reflection through the relay system to generate a relocated reflection and most preferably further comprises sensing the relocated reflection. In addition, the preferred method of the invention utilizes a primary reflector and a secondary reflector having shapes and sizes that give rise to a second reflection that is substantially free of field curvature effects.

The present invention also contemplates a method of providing a substantially planar and stigmatic reflection of a super wide-angle field of view captured from a substantially single reference viewpoint comprising: (a) providing a primary reflector having a first shape and a first size to generate a first reflection of a super wide-angle scene; and (b) providing a secondary reflector having a second shape and a second size to accept the first reflection and to generate a second reflection, in which the shapes and sizes of the primary and secondary reflectors, and their respective positions, are such as to give rise to a second reflection that is substantially planar and stigmatic and in which a super wide-angle field of view is captured from a substantially single reference viewpoint. In specific embodiments the method further comprises substantially filtering out optical rays other than those reflected directly by the secondary reflector from incoming optical rays reflected directly by the first reflector to provide a filtered reflection. In addition, the method may further comprise relaying the filtered reflection to another location to provide a relocated reflection and then sensing the relocated reflection.

The teachings of the present invention will now be understood by a person skilled in the art, by reference to the following description of the inventive apparatus. Illustrative examples of embodiments are also provided below as examples, that will be understood by those skilled in the art, as demonstrating how an apparatus according to the teachings of the present invention may be made and used.

Similar reference numbers in the figures refer to corresponding elements in different embodiments.

Figure 16:
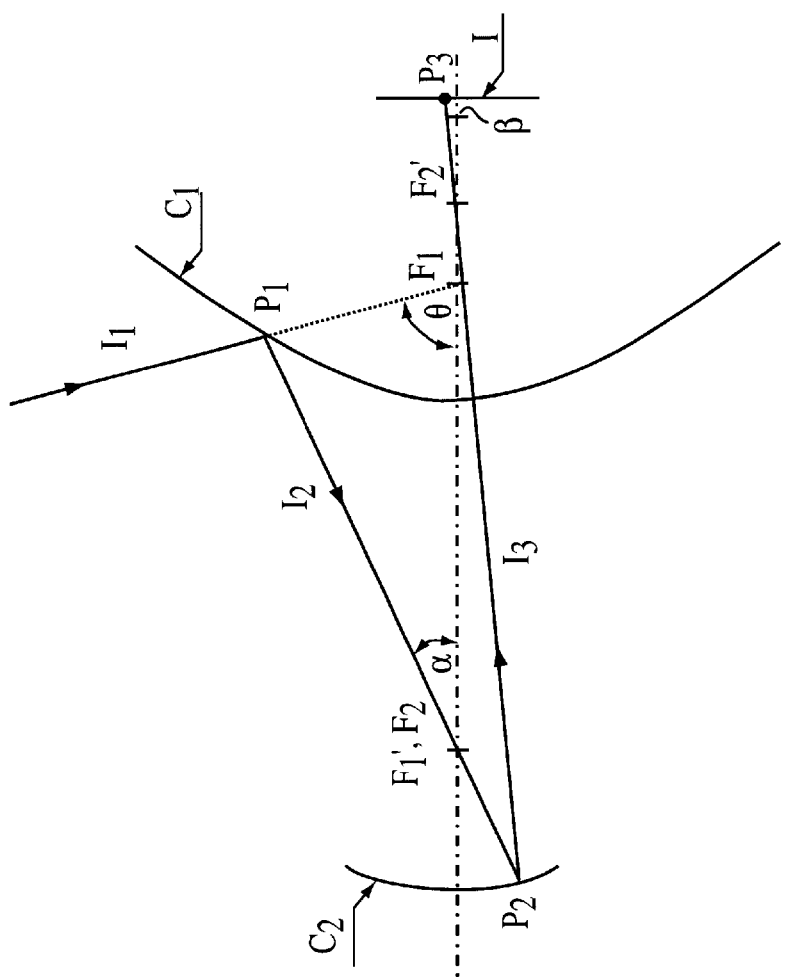

FIG. 16 shows a sectional view of the path of a principal ray of light in a confocal two-mirror system, in which the primary mirror is a hyperboloid and the secondary mirror is an ellipsoid. Principal ray of light $I_1$ from the scene in the direction of the virtual entrance pupil (which coincides with the near focus $F_1$ of the primary hyperboloid mirror $C_1$), strikes the primary mirror $C_1$ and is reflected along $I_2$ by the hyperboloidal mirror in the direction of its far geometrical focal point $F'_1$, to intersect the optical axis at $F'_1$. A real intermediate image of the virtual entrance pupil is formed at this point.

The reflected ray $I_2$ then strikes the secondary ellipsoidal mirror $C_2$. Since the near geometrical focal point $F_2$ of the secondary mirror coincides with $F'_1$, the ray $I_2$ is reflected by the ellipsoidal mirror along $I_3$ in the direction of the far geometrical focal point $F'_2$, through the hole in the mirror $C_1$. A real intermediate image of the object space is formed immediately after reflection from the ellipsoidal mirror. Note that real intermediate images for the pupil and for the object are located in different optical spaces: the former lies in the optical space between the two mirrors, while the latter lies in the space between the second mirror and the relay lens $R_1$.

The entrance pupil of the relay objective lens $R_1$ is located at the far focus of the ellipsoidal mirror $F'_2$, conditionally shown in FIG. 16 as a real diaphragm. The relay objective lens forms a final image of the scene on a planar two-dimensional sensor, surface I. The image is annular with a small black circle in the center: a result of vignetting of the object space by the secondary mirror $C_2$ and the hole in the first mirror $C_1$.

The relationships between the various angles in the figure are given by:

$$\tan\beta = \frac{(1+k_1)\sin\theta}{2\sqrt{-k_1 + (1-k_1)\cos\theta}}, \text{ and} \quad (5)$$

$$\tan\alpha = \frac{(1+k_2)\sin\beta}{2\sqrt{-k_2 + (1-k_2)\cos\beta}}. \quad (6)$$

Equations (5) and (6) give:

$$\tan\alpha = \frac{(1+k_e)\sin\theta}{2\sqrt{-k_e + (1-k_e)\cos\theta}} \quad (7)$$

where, $$k_e = -\left(\frac{\sqrt{-k_1} + \sqrt{-k_2}}{1 + \sqrt{-k_1}\sqrt{-k_2}}\right)^2 \text{ or } k_e = -\left(\frac{1 + \sqrt{-k_1}\sqrt{-k_2}}{\sqrt{-k_1} + \sqrt{-k_2}}\right)^2. \quad (8)$$

6. EXAMPLES

6.1. Example One

FIG. 1 illustrates a first exemplary embodiment of a panoramic imaging apparatus according to the present invention. A convex hyperboloidal reflector $C_1$ had a 25.658 mm radius of curvature at the vertex and a conic constant $k_1 = -3.6205$. A concave ellipsoidal reflector $C_2$ had a 32.150 mm radius of curvature at the vertex, and a conic constant $k_2 = -0.2398$ was positioned at a distance 50 mm from the $C_1$ mirror. A pinhole camera with focal length 7 mm was positioned at a distance 13 mm from the vertex, on the right hand side of the $C_1$ mirror, and played a role of microprojection lens. Image plane I was at a distance 8.43 mm from the pinhole lens. The panoramic imaging apparatus covered a 200 degree vertical field of view and a 360 degree horizontal field of view. Its F number was 2.5, and focal length was −0.9 mm. Principal rays of the bundles of light beams from the panoramic scene went into the near virtual geometrical focal point of the hyperboloid mirror C1 (not shown in FIG. 1), struck the mirror surface, and were reflected by $C_1$ such that they passed through the far geometrical focal point of the hyperbolic mirror $C_1$. A concave ellipsoidal reflector $C_2$ was positioned such that its near geometrical focal point $F_2$ coincided with $F'_1$. Ellipsoidal mirror $C_2$ received the reflected image from C1 and reflected it back through a hole in the primary reflector, such that all primary rays of light passed through its far focus, $F'_2$, that coincides with an aperture, R, of the pinhole lens $H_1$ to filter out rays of light that do not pass through $F'_2$. An image sensor I was positioned behind the aperture to sense the image of the scene.

Figure 2A:
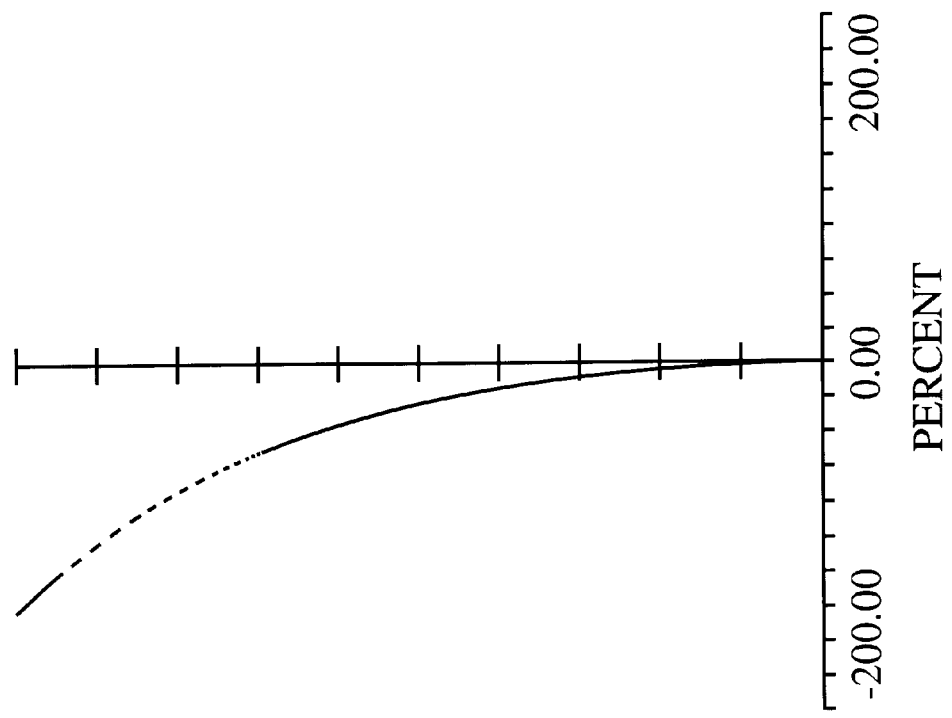

FIG. 2(a) is a graph of the field curvature of the two mirror system for this example. As can be seen from the graph, the system has a substantially flat panoramic imaging field of view. Total nonflatness is less than 10 micrometers. The optical system optimization was done using conic constants and radii of curvature of both mirrors to correct for higher order field curvature. Further, the graph shows that both saggital and tangential field curvatures (depicted by S and T in the figure) follow each other. This is indication that the system has no astigmatism in addition to a substantially single viewpoint of reference for the entire imaging system.

Figure 2B:
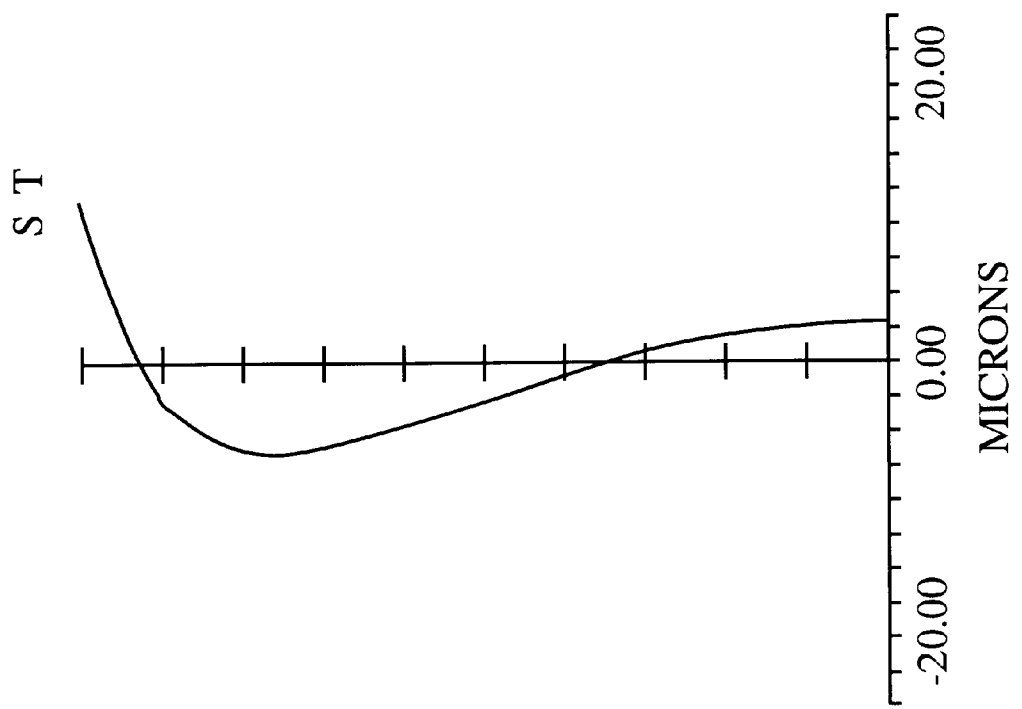

FIG. 2(b) is a graph of distortion in the imaging system. In the present case, we consider it a specific image compression, which may be appropriately uncompressed by computer software.

Figure 3:
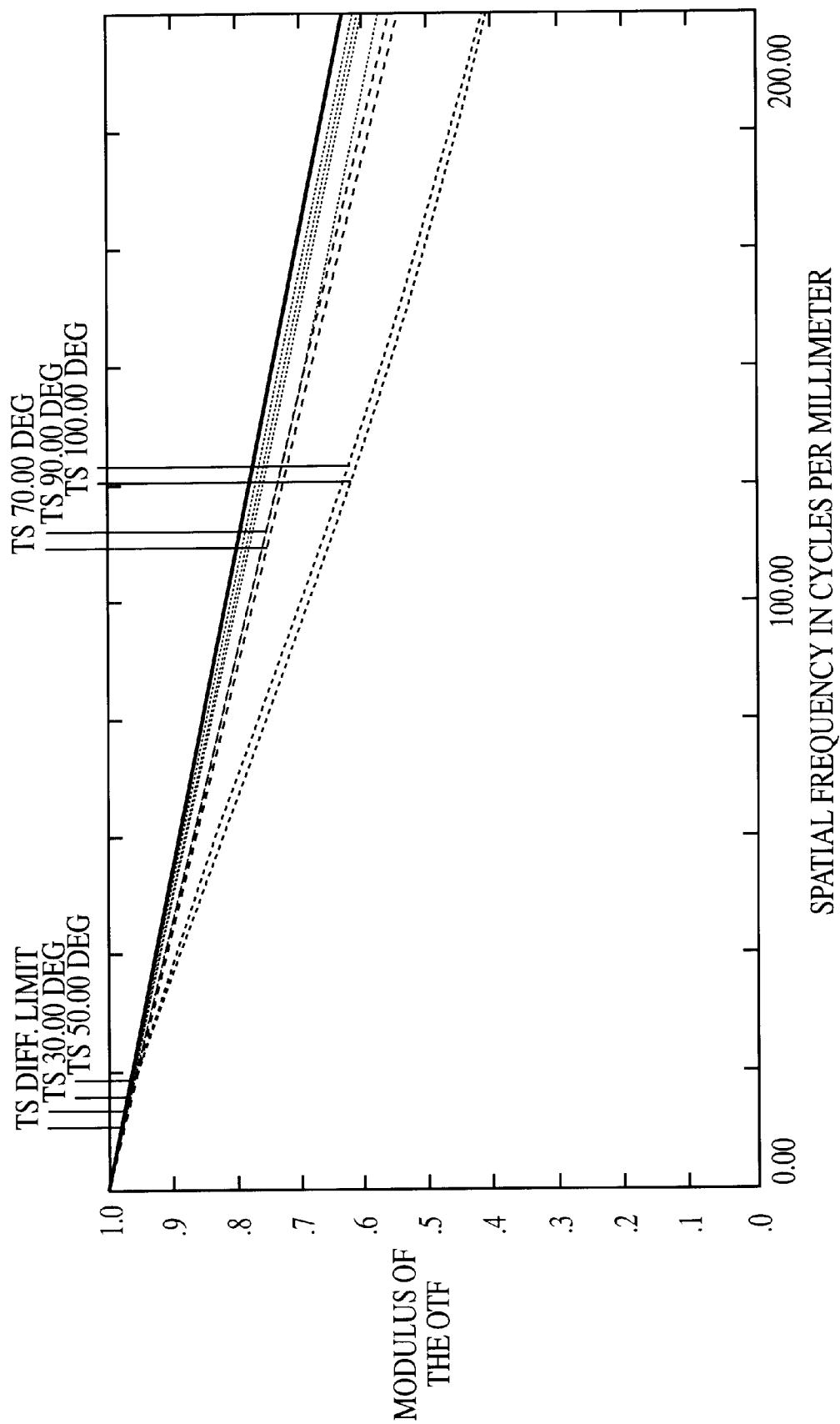

FIG. 3 is a graph of the modulation transfer function (MTF) of the two mirror imaging system as compared with a diffraction limited system for polychromatic light. As can be seen from the graph, the panoramic imaging system provides resolution of 200 line pairs per mm.

This exemplary embodiment, as do the others described herein, illustrates the two key features of the present invention: a substantially compact/single viewpoint of reference and a substantially flat and fully stigmatic image over the entire field of view.

Although the description herein is with regard to visible light, it is to be understood that the present invention has equal application to other forms of electromagnetic radiation such as ultraviolet light or infrared light, and the appended claims are to encompass an apparatus that works with these forms as well as with visible light.

6.2. Example Two

Figure 4:
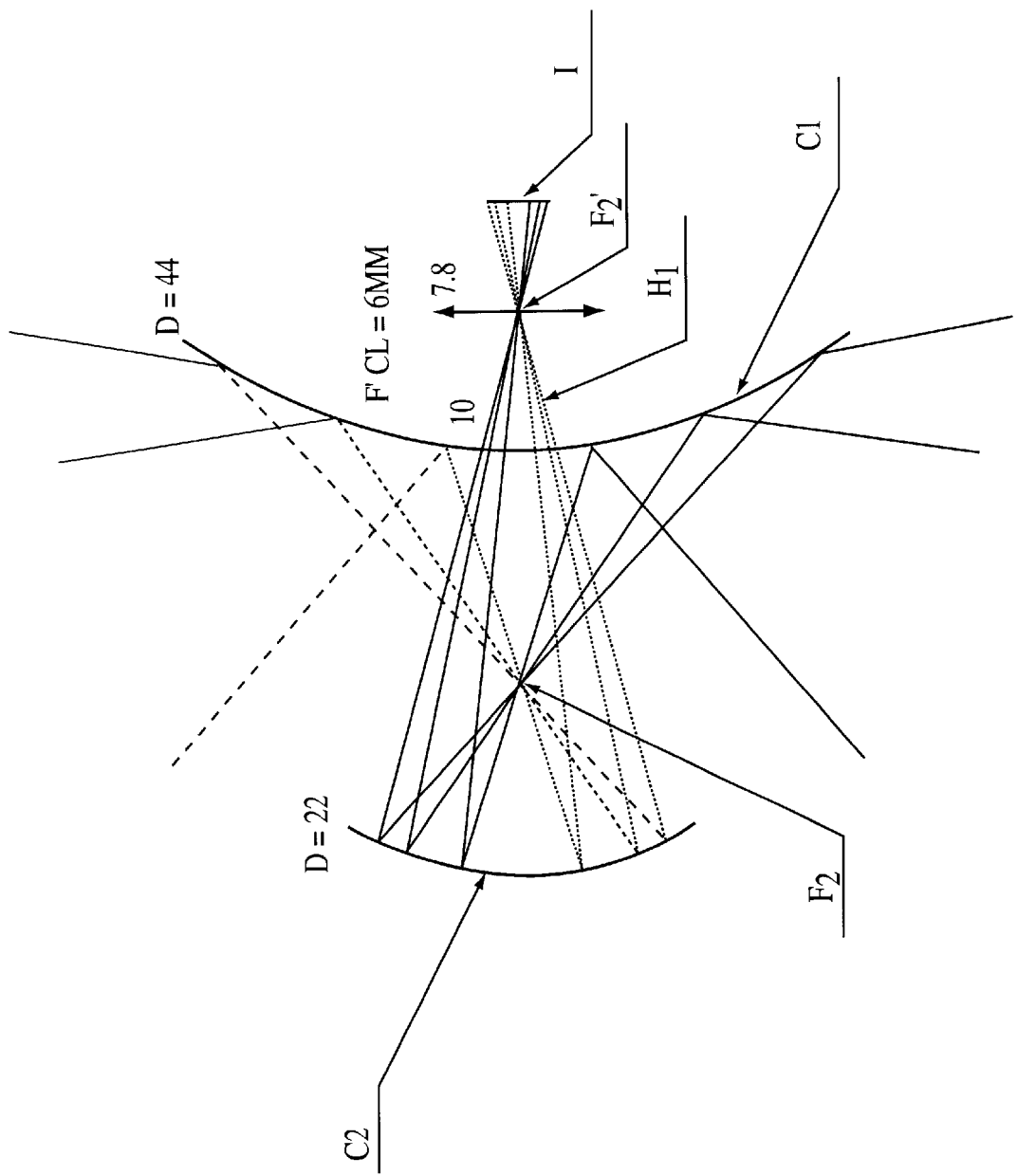

FIG. 4 illustrates a second exemplary embodiment of a panoramic imaging apparatus according to the present invention. A convex hyperboloidal reflector $C_1$ was positioned to reflect an image of a 200 degree field of view. Principal rays of light from the scene that are reflected by $C_1$, were picked up by the secondary reflector, $C_2$, that was a truncated sphere. The reflection by $C_2$ obeyed the laws of Gaussian optics, in $F_2$ and $F'_2$ are the two conjugate optical points of the reflector $C_2$. Rays of light that passed through $F_2$ were reflected by $C_2$ such that they passed through $F'_2$. In this exemplary embodiment, $F_2$ substantially coincided with $F'_1$, the far focus of $C_1$. When the two foci do not coincide exactly, the dominating factor in the system is the reflection law by $C_2$. In such an arrangement, the imaging system will not have an exact single viewpoint of reference. Instead the viewpoint travels on a surface that is known as the caustic of reflection. For positions of F2 that are between $H_1$ and $F'_1$, the caustic is a substantially compact surface and the viewpoint of the entire system can be approximated to $F_1$ with minimal distortion in the sensed image. Once again, R, was a pinhole aperture that filters out rays that do not substantially belong to the sensed image and I was an image sensor such as a CCD, CMOS, film, or other sensing device adaptable for use with the optical apparatus of the invention. The focal length of the pinhole camera was 6 mm, the back focal length was 7.8 mm, its distance from the mirror $C_1$ vertex was 10 mm. The image circle diameter was 4 mm, the F number of the system was 2.5, and the focal length was 1.2 mm.

Figure 5B:
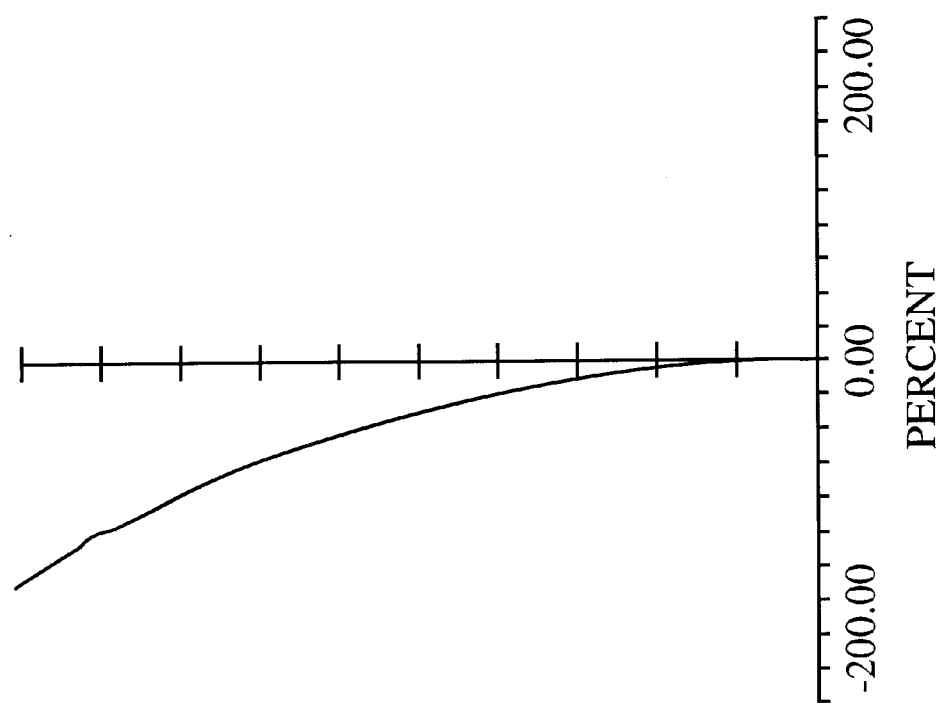
Figure 5A:
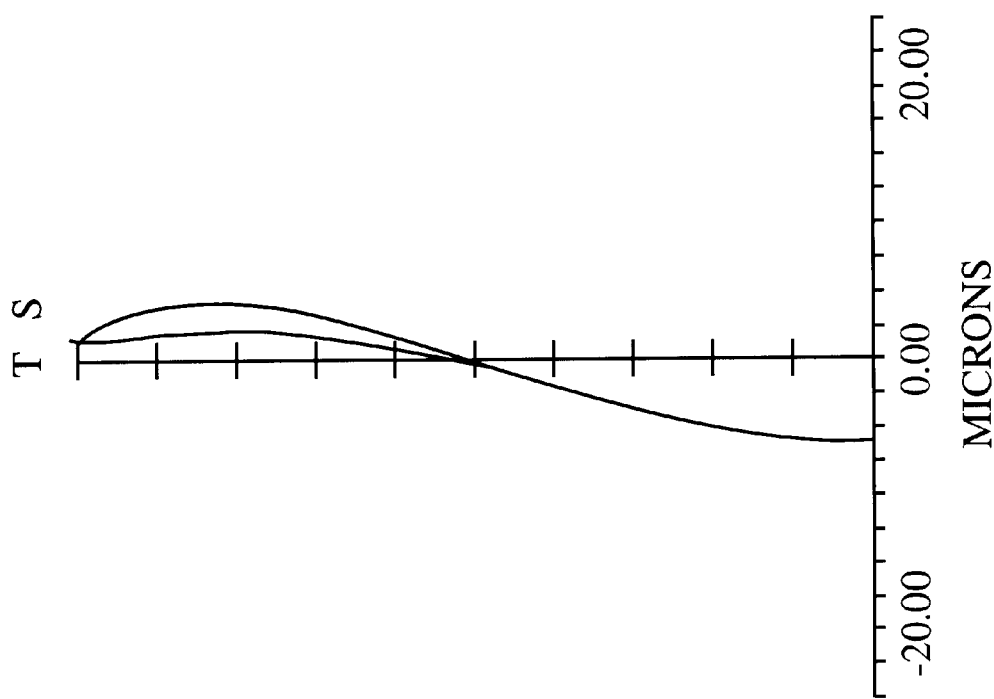

FIG. 5(a) shows a graph of the field curvature of the two mirror imaging system. As can be seen from the graph, the two mirror system has a substantially flat field of curvature, nonflatness is no more than 6 micrometers. In addition, the astigmatism exhibited by the system is no more than 2 micrometers. Spherical aberration in pupils is very small and hence the viewpoint of the entire system is substantially compact and can be approximated as a single point without any loss in quality.

FIG. 5(b) shows a graph of the compression in the two mirror system.

Figure 6:
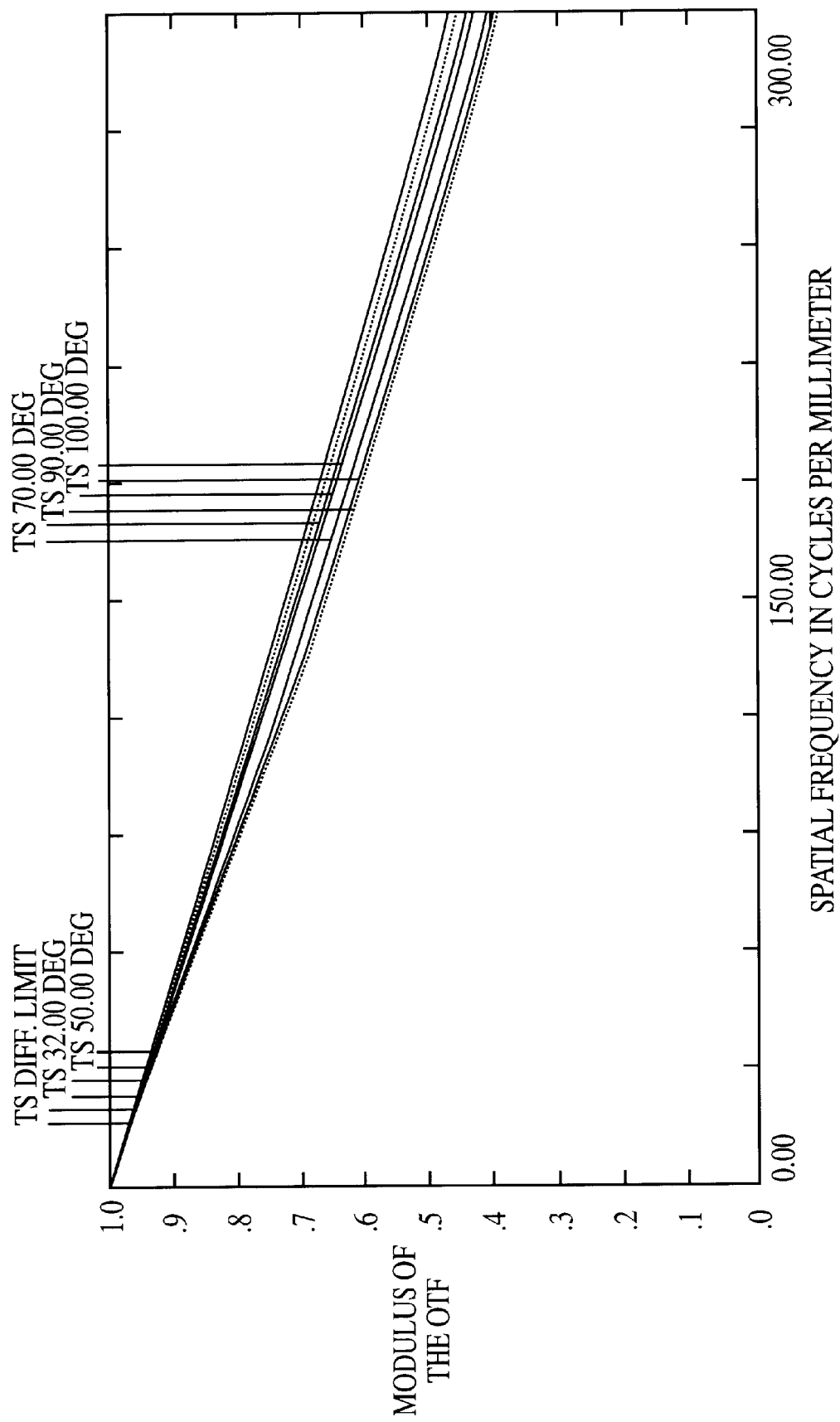

FIG. 6 shows a graph of the modulation transfer function (MTF) of the two mirror imaging system as compared with a diffraction limited system for polychromatic light. As can be seen from the graph, the MTF of the embodiment follows that of the diffraction limited system substantially further, indicating that the optical quality of the two mirror system is close to ideal. Resolution of the system is 400 lp/mm (line pairs per mm) under 40% of contrast.

6.3. Example Three

Figure 7:
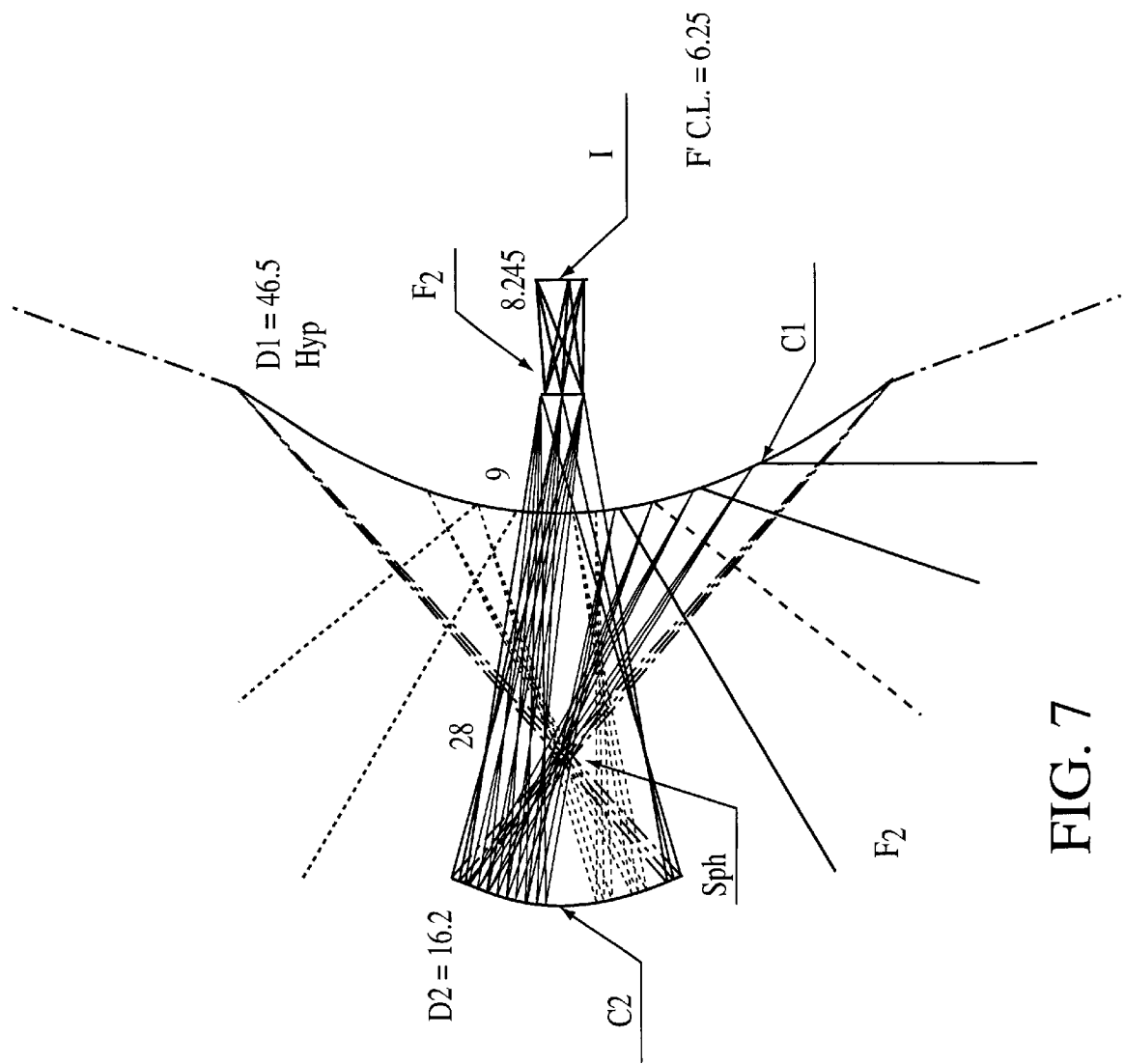
Figure 8B:
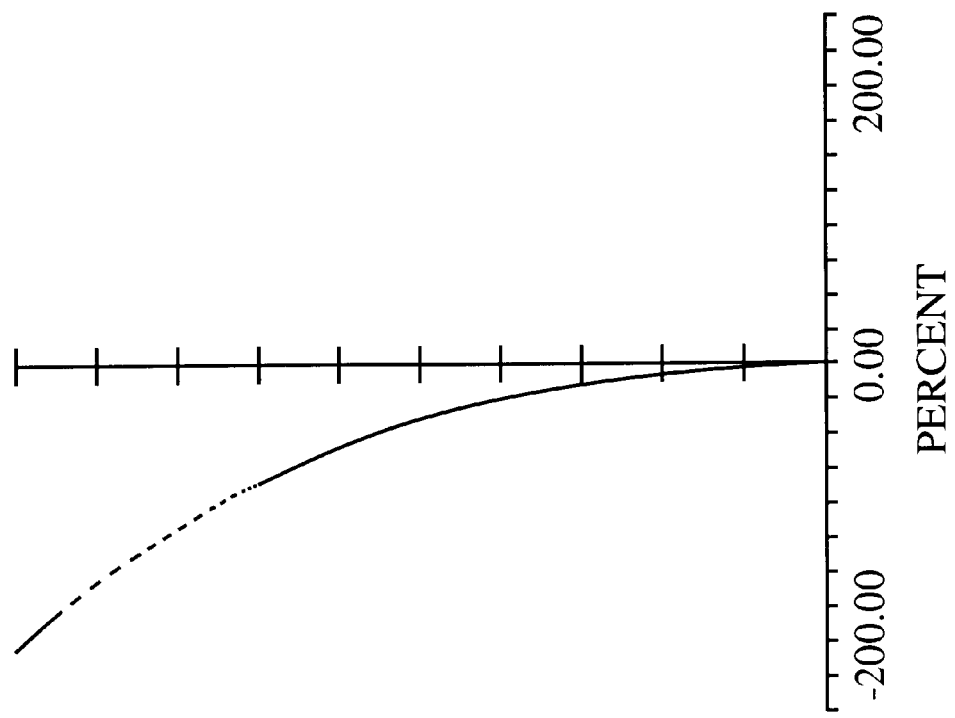
Figure 8A:
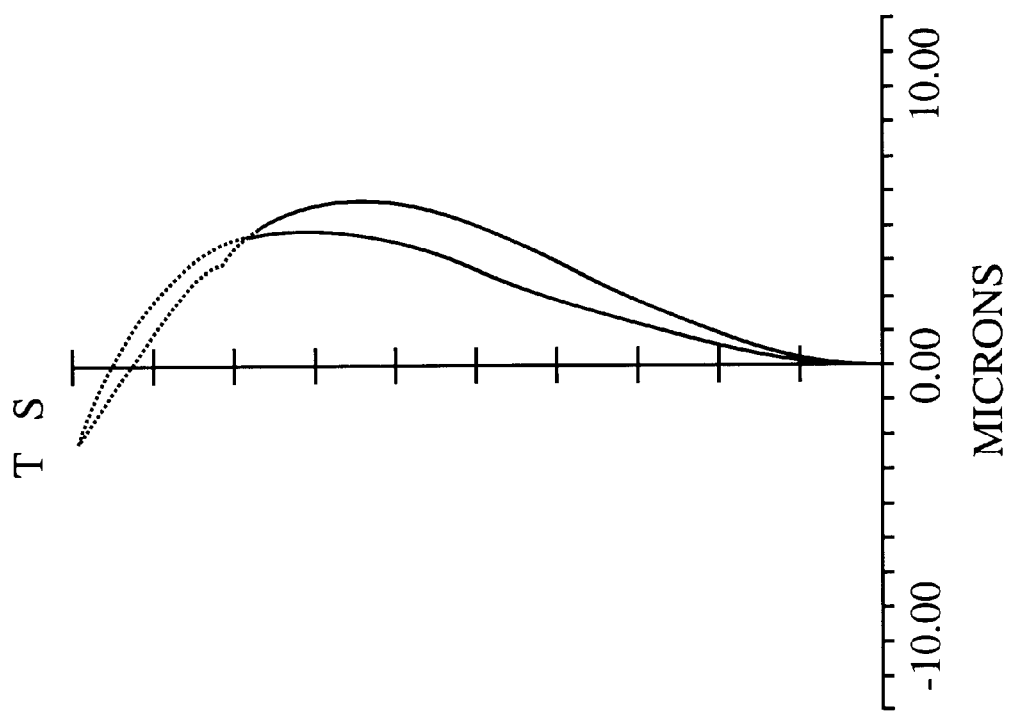
Figure 9:
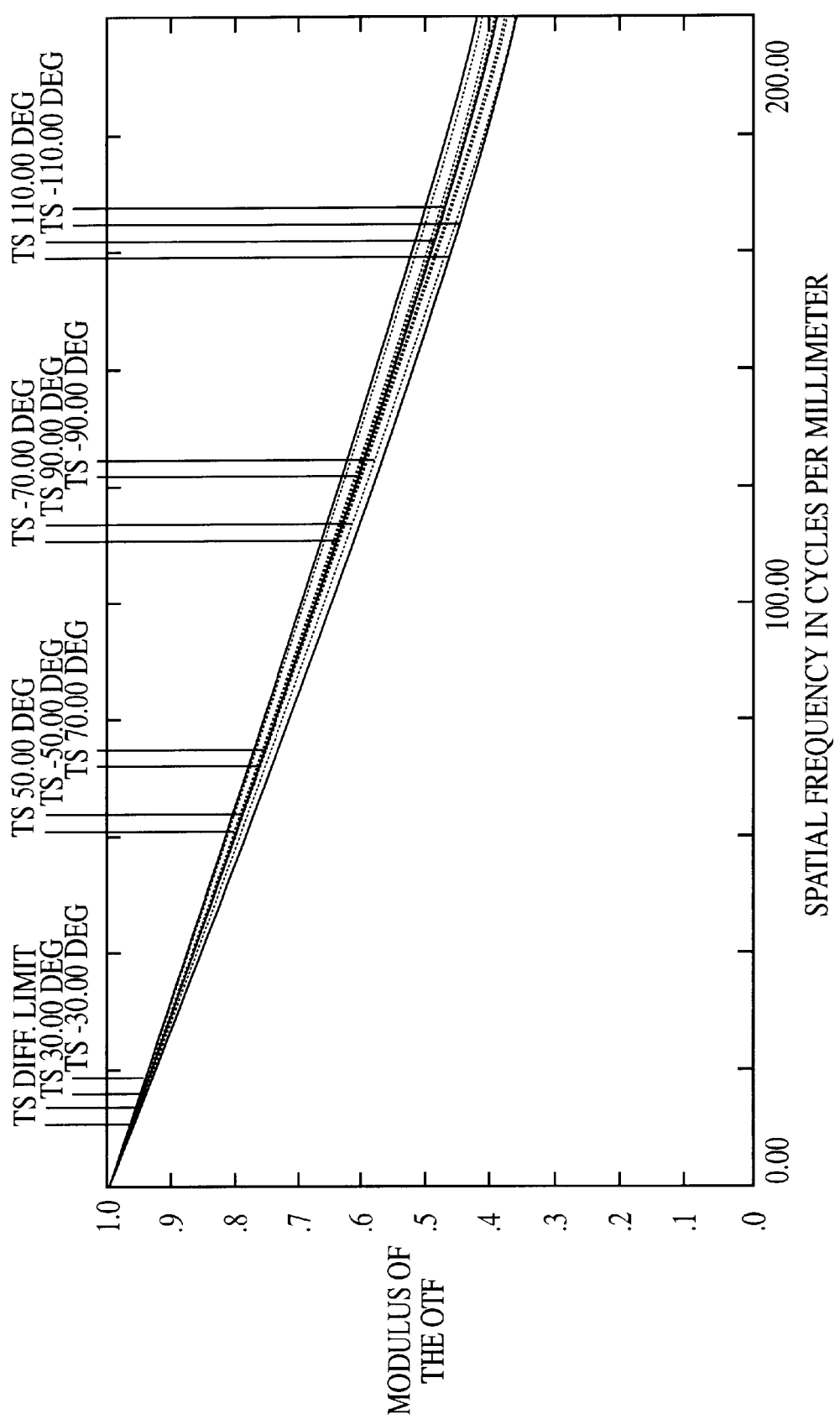

FIG. 7 illustrates a third exemplary arrangement of the present invention wherein the primary reflector was hyperboloidal in shape and the secondary reflector was spherical, hence ellipsoidal. Field of view of this system was 220 degrees in a vertical plane, the F number was 2.8, the focal length was −0.95 mm, the image diameter was 3.6, which fits to a one third inch (0.85 cm) CCD. The microprojection relay lens had a focal length of 6.25 mm, a back focal length of 8.245 mm, and a distance from the $C_1$ vertex of 9 mm. Once again, as in the earlier arrangement, the position of the secondary reflector was between the far focus of the primary reflector and the apex of the primary reflector. In such an arrangement, the spherical aberration in pupils was minimal as can be seen from the graphs of saggital and tangential field curvature from FIG. 8(a). The graphs of S and T closely follow each other, indicating a compact caustic of viewpoints. FIG. 8(b) shows a graph of the distortion by the system. FIG. 9 is a graph of the MTF of the system, which shows that the system closely follows a diffraction limited system which is the physical limit on an optical system. The first mirror diameter was less than about 5 cm. As in the case of the second example, the apparatus of this example fits to commercial robotics and is suited for machine vision applications.

6.4. Example Four

Figure 10:
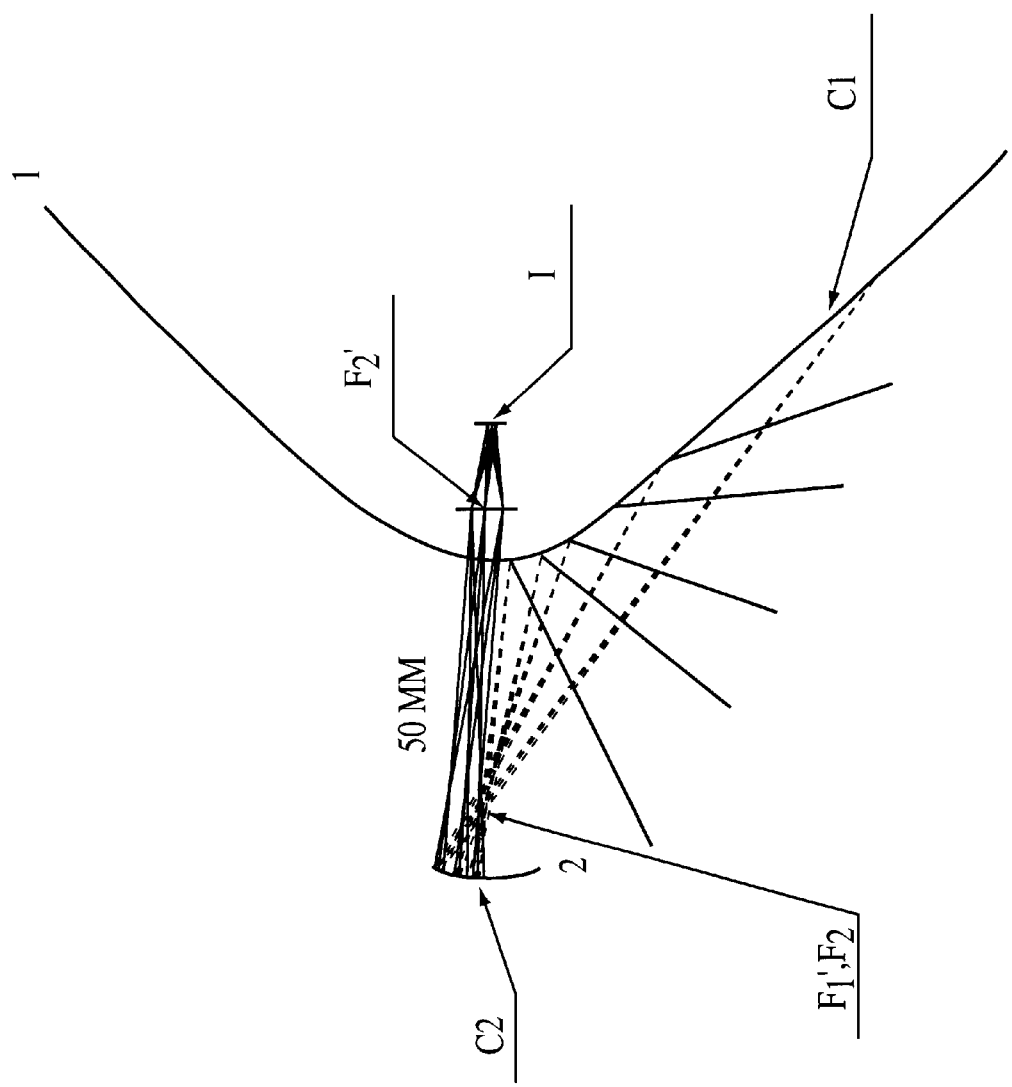
Figure 11B:
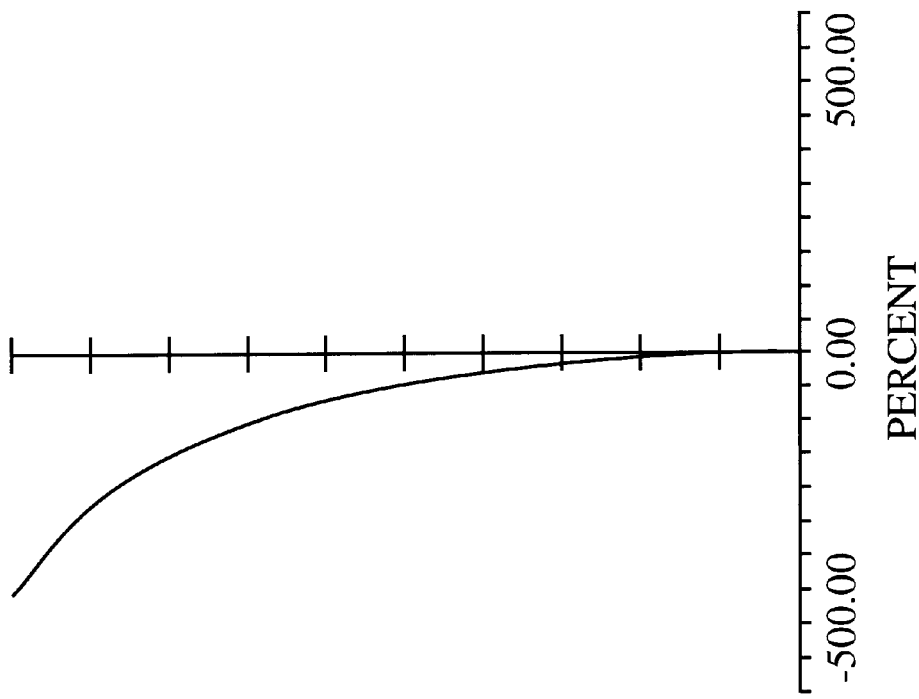
Figure 11A:
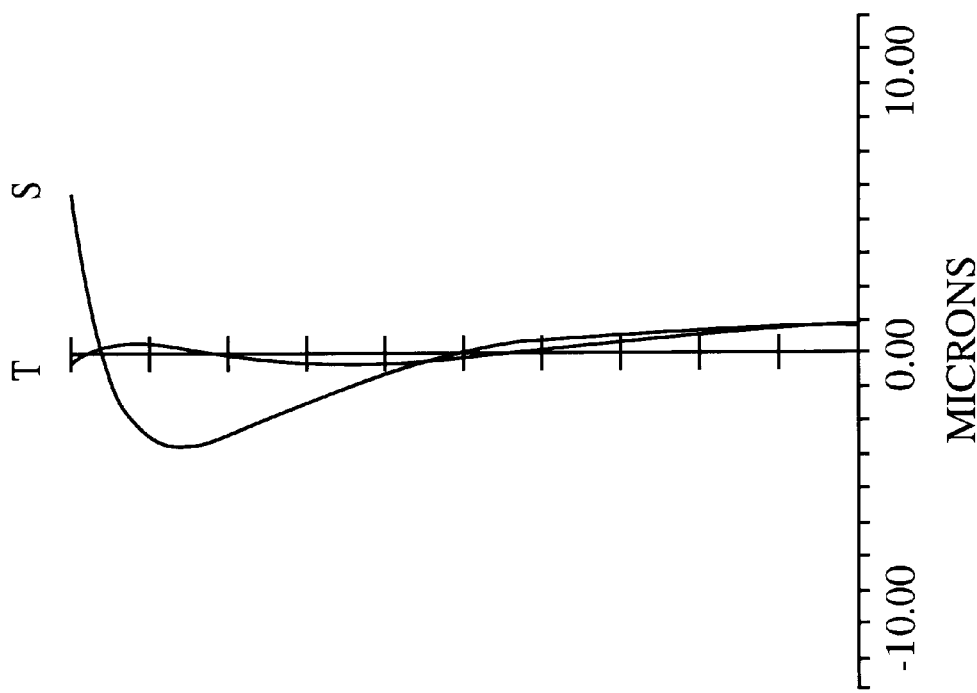
Figure 12:
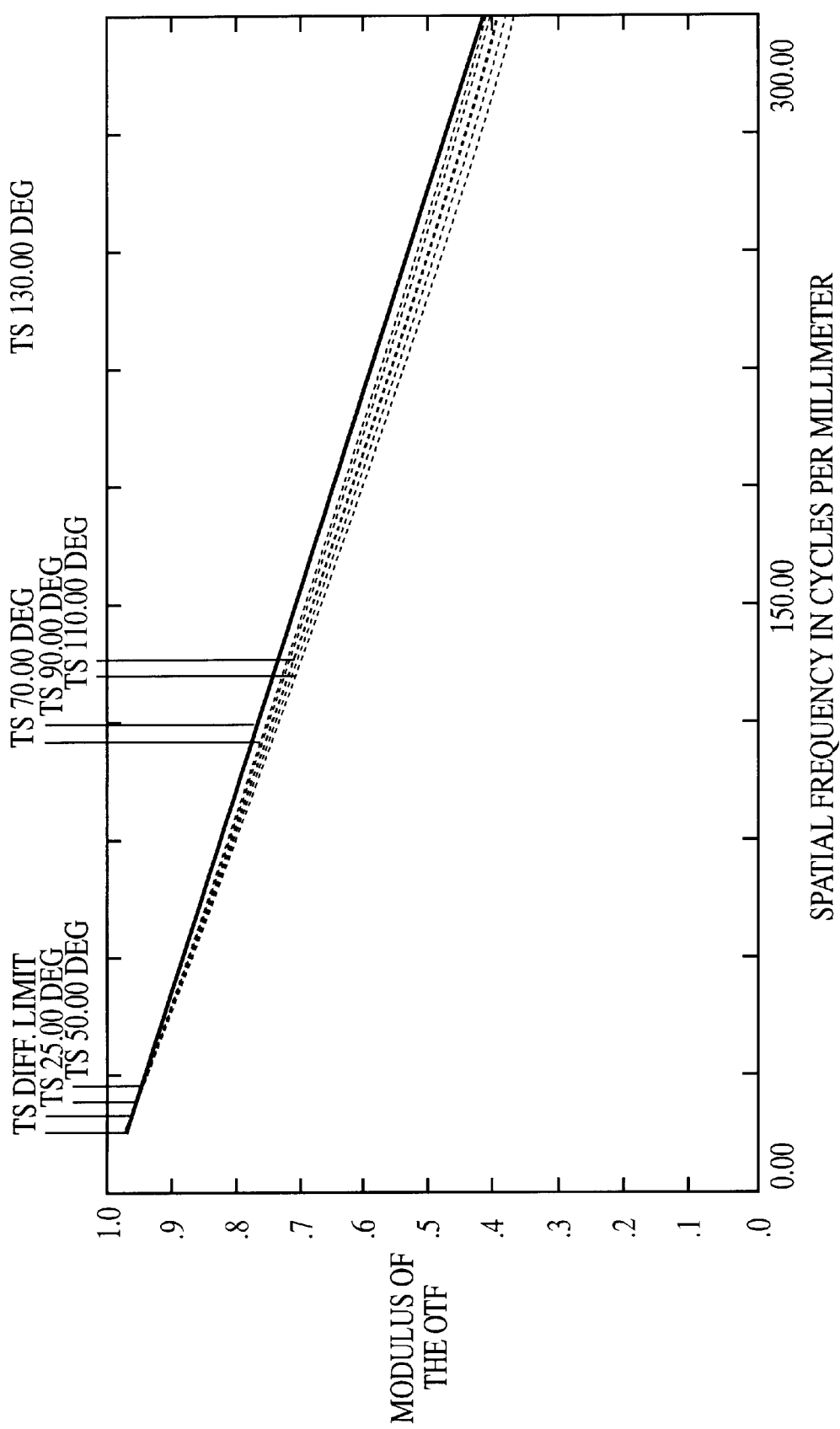

FIGS. 10, 11(a)(b) and 12 illustrate a fourth exemplary embodiment that was similar to the first embodiment in FIG. 1. The primary and secondary mirrors were once again convex hyperboloidal and concave ellipsoidal, respectively—and had almost equal radii of curvature at the vertexes. Field of view of the system was 260 degrees in a vertical plane, focal length was −0.6 mm, F number was 2.8, and image diameter was 3.6 mm. Relay focal length was 10.25 mm, its back focal length was 13.2 mm. Image quality was comparable (300 lp/mm under 40% of contrast), as for the second and third examples. From FIG. 11(a) can be seen the very high level of the astigmatism and field curvature correction. Image flatness is in the range of from about 4 to about 5 micrometers. This kind of image quality correction was achieved without introduction of higher order aspherical surfaces for the two mirrors. On the other hand, the first hyperbolic mirror diameter was about 135.5 mm, i.e., about three times that of the first and second examples.

6.5. Example Five

Figure 13:
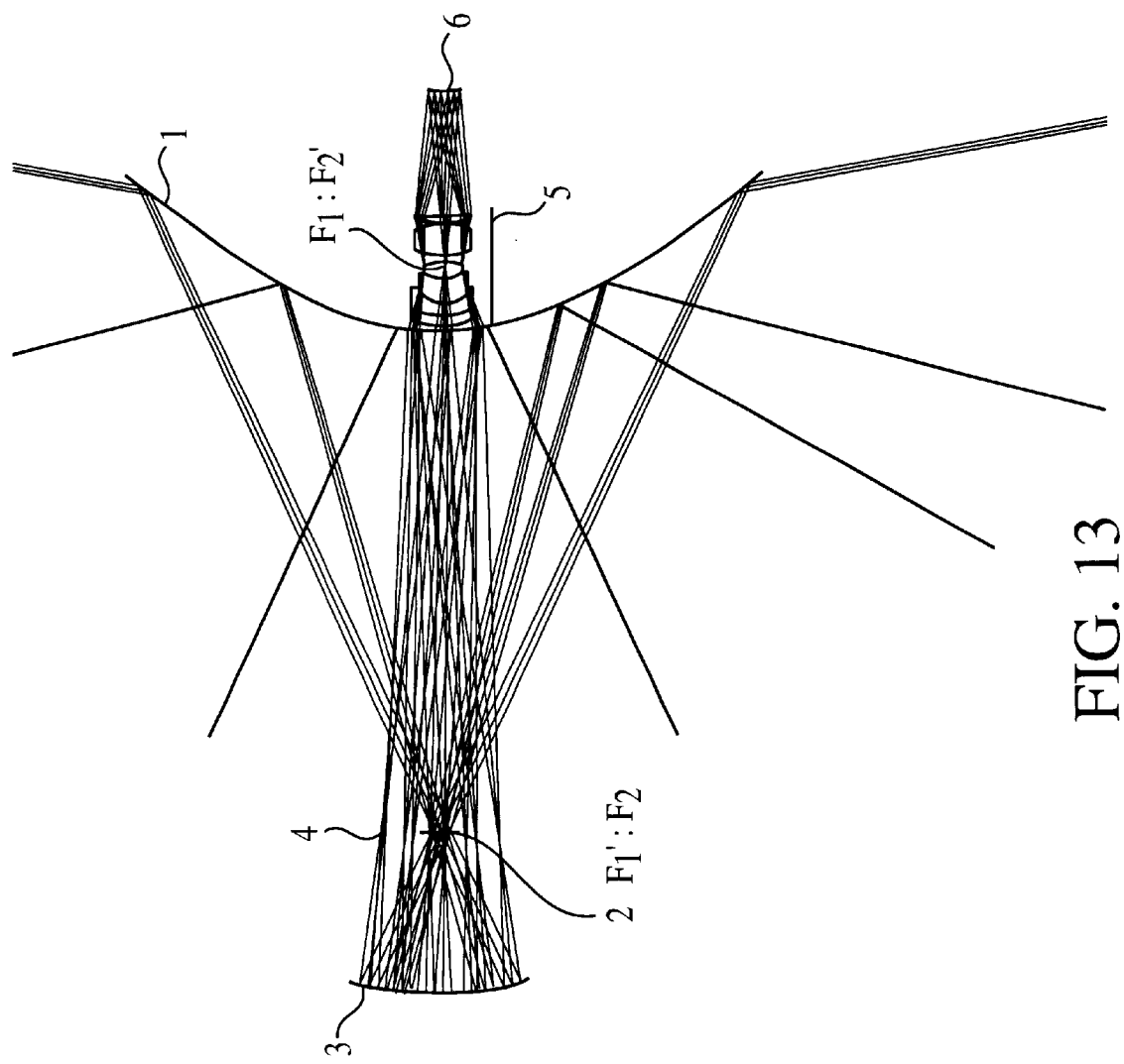

FIG. 13 shows a fifth exemplary arrangement in which the relay objective was now a Double-Gaussian type of lens, indicated by 5. The rest of the arrangement is similar to that in FIG. 1, in that the primary mirror was hyperboloidal in shape, the secondary reflector was ellipsoidal in shape and the two conics were strictly confocal. Again, in this arrangement, the caustic of viewpoints was substantially a single viewpoint and hence the system had a single viewpoint of reference.

6.6. Example Six

Figure 14:
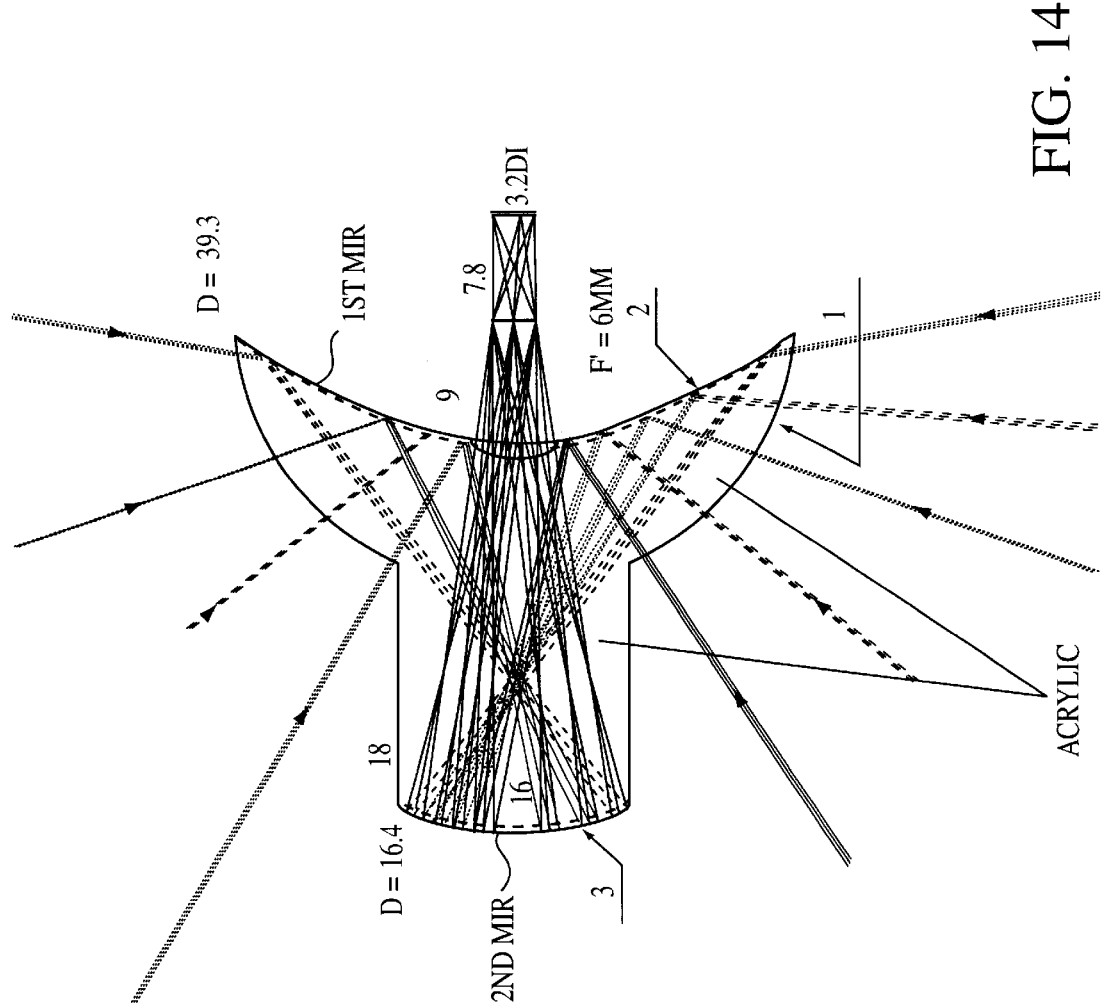

FIG. 14 shows a sixth exemplary arrangement which showed a possible opto-mechanical arrangement for the two reflectors. In this arrangement, the two reflectors were made of the same block of transparent plastic material such as an acrylic resin. The primary reflector is indicated by 2 and was formed by shaping one surface of the block as in the shape of a hyperboloid of revolution. The outer surface of the block was coated with an appropriate reflecting material, transforming the surface 2 to act like a hyperboloidal back reflector. The surface 3 was shaped to represent an ellipsoid of revolution or a sphere, as per the arrangements discussed above, and coated on the outside with appropriate reflective material to form a back reflector. The length of the block obeys the equations described above and depends on the particular arrangement of reflectors. The appropriate central part 4 of the surface 2 was left uncoated, so that it worked as a refractive surface, having the same shape as hyperboloid 2. Surface 1 was transparent to allow rays of light to enter the imaging system. Further, the surface at 4 can optionally be appropriately shaped to account for the refractive effects of the transparent block, so the shape of the surface 4, in general was different from the shape of the surface 2. The best way to keep a single point of view for the whole system is to make both refractive surfaces 1 and 4 as spherical surfaces with normal incidence of the principal rays entering and leaving from the system. At the same time, their radii of curvatures should have the specific values not introducing chromatic aberrations in the working wavelength range of the whole system.

6.7. Example Seven

Figure 15:
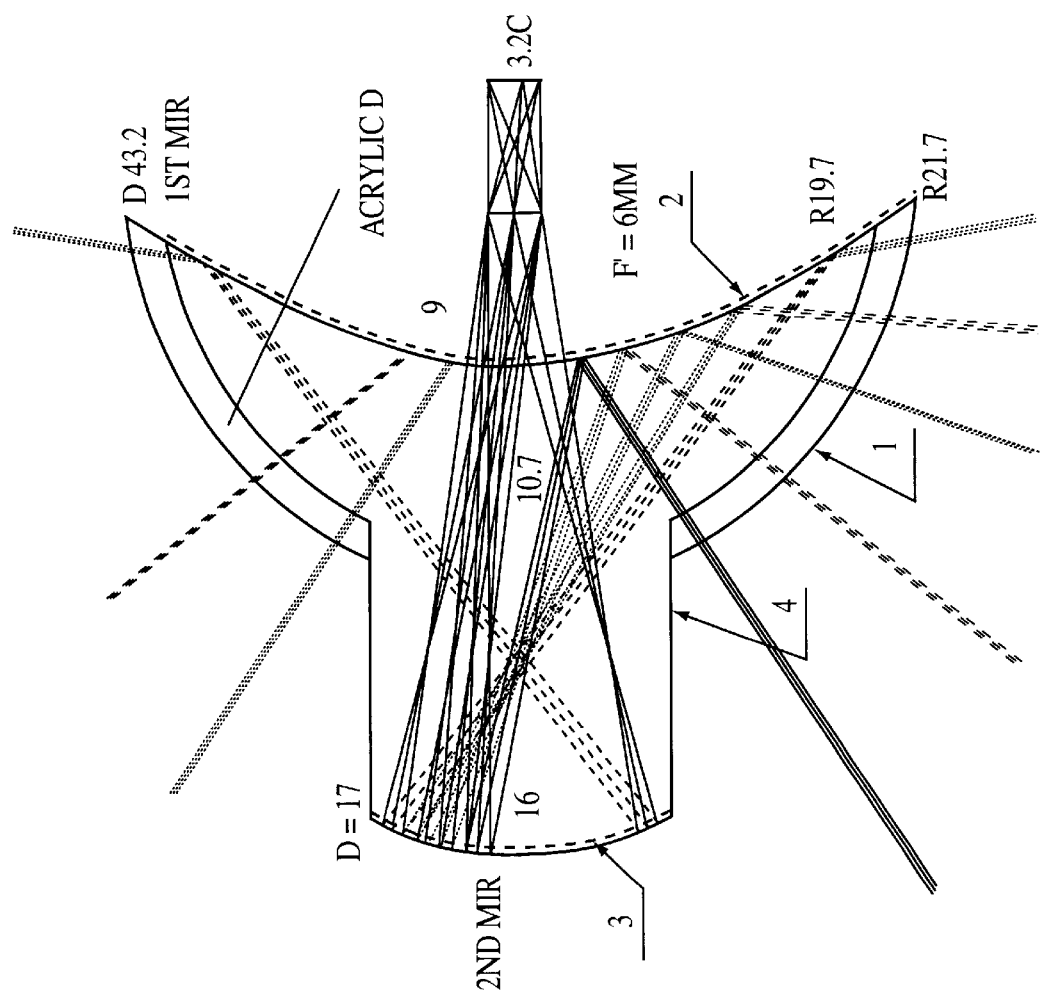

FIG. 15 shows a seventh exemplary opto-mechanical arrangement for the two mirror system. The secondary mirror was held in place by a transparent dome 1 made of appropriate material to which a cylinder 4 was attached. The secondary reflector was mounted on this cylindrical attachment. The surface of 4 was coated to prevent light from entering the cylindrical attachment. The shape of the dome and the shape of the cylindrical attachment were determined to match the optical arrangement of the system.

6.8. Example Eight

Figure 17:
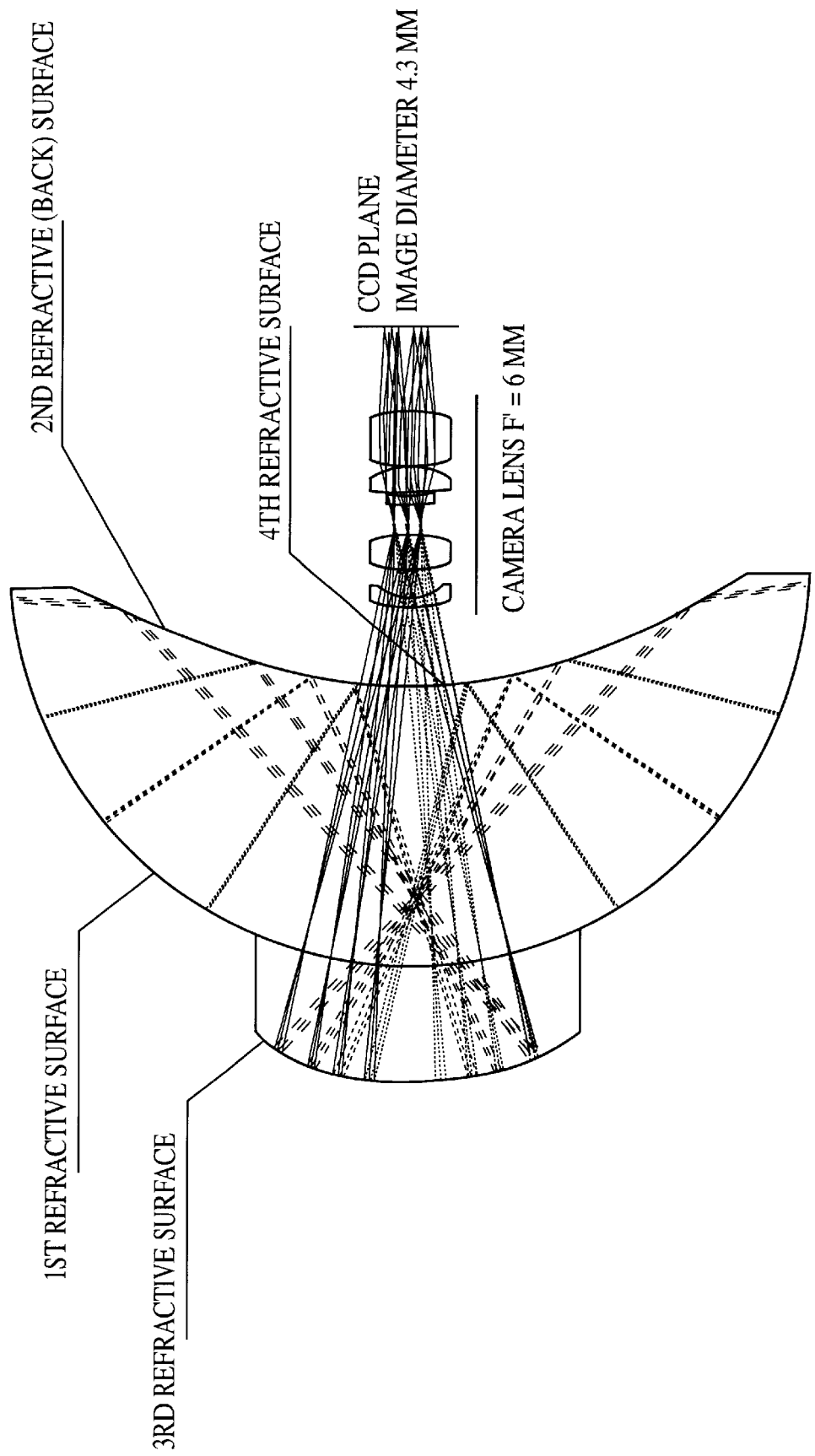
Figure 18:
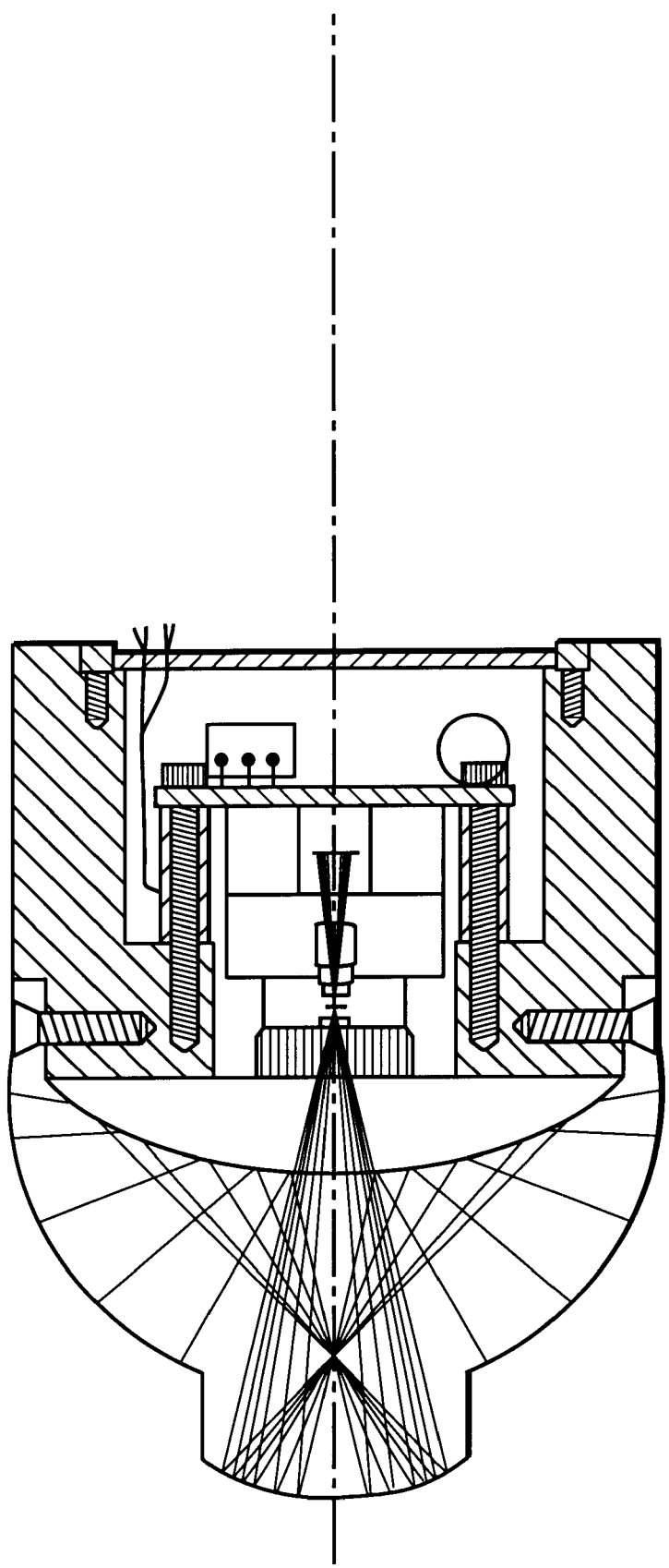
Figure 19:
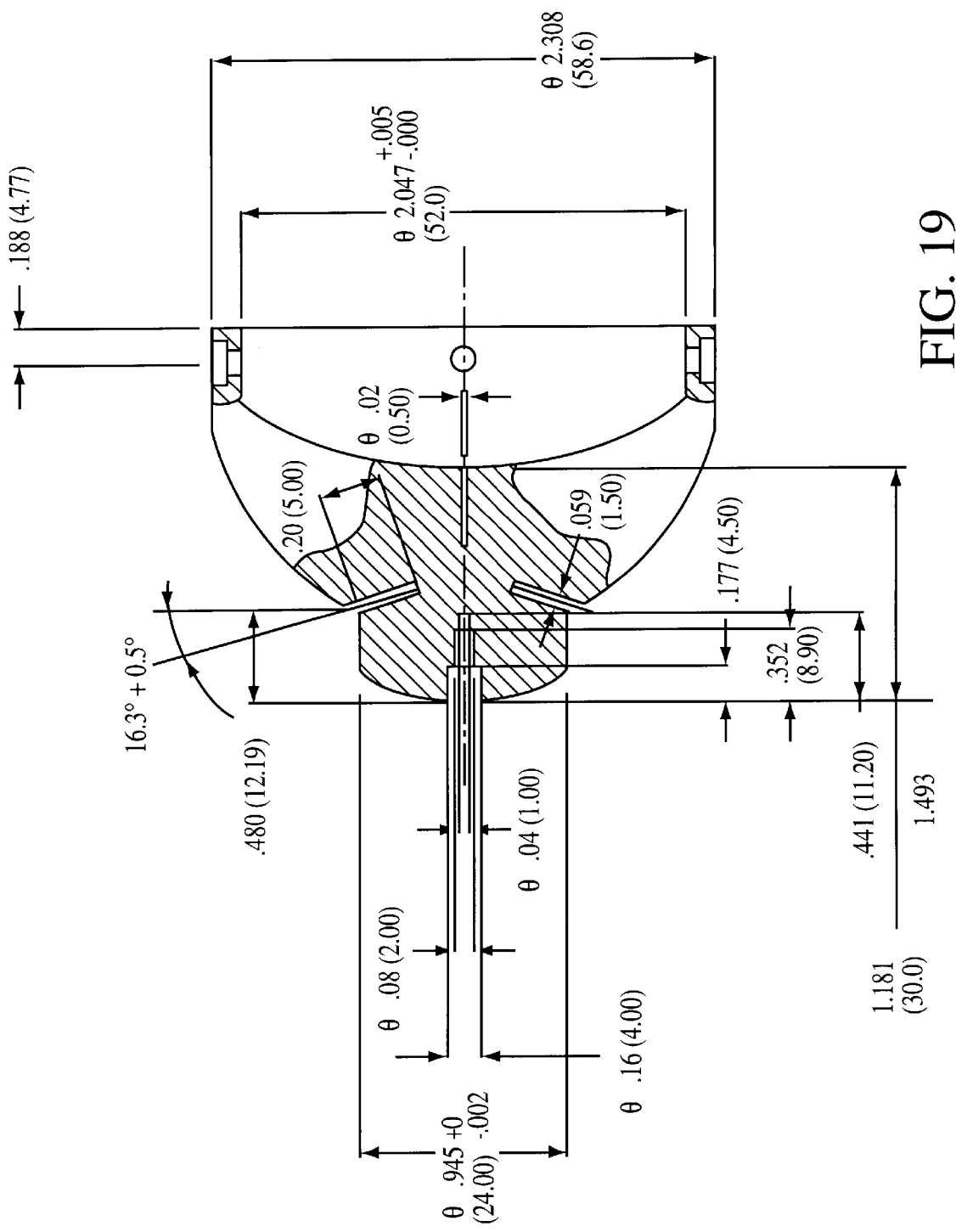

FIGS. 17, 18, and 19 show an exemplary arrangement in which the two-mirror system was integrated in a single optical block. Both mirrors were back reflectors that provided for good environment protection. Of the four surfaces of interest in the optical block, the first and the last surfaces were refractive ones, such that principal rays cross the surfaces under normal incidence without refraction, keeping a single view point for the whole system. Aperture rays that refract at these surfaces, were handled by achromatization of the surfaces. Both refractive surfaces preferably have broadband multi-layer coatings to increase image contrast, and to prevent ghost images on the detector surface.

To prevent ghost images, ambient light and increase image contrast, two pins (a) were introduced from both reflective surfaces and a groove (b) was appropriately introduced at the intermediate real image location (shown in FIG. 19). Note that these pins may actually comprise holes drilled through the solid optical block, and coated or surfaced so as to be opaque. Similarly, the grooves are machined into the optical block.

A relay system is positioned after the second reflective surface of the mirror block to project the real image on the flat sensor (shown in FIGS. 17 and 18). The relay system is either a standard camera lens with appropriate focal length or, preferably, a specially designed micro-projection lens to get a powerful high-resolution system.

6.9. Example Nine

Figure 20:
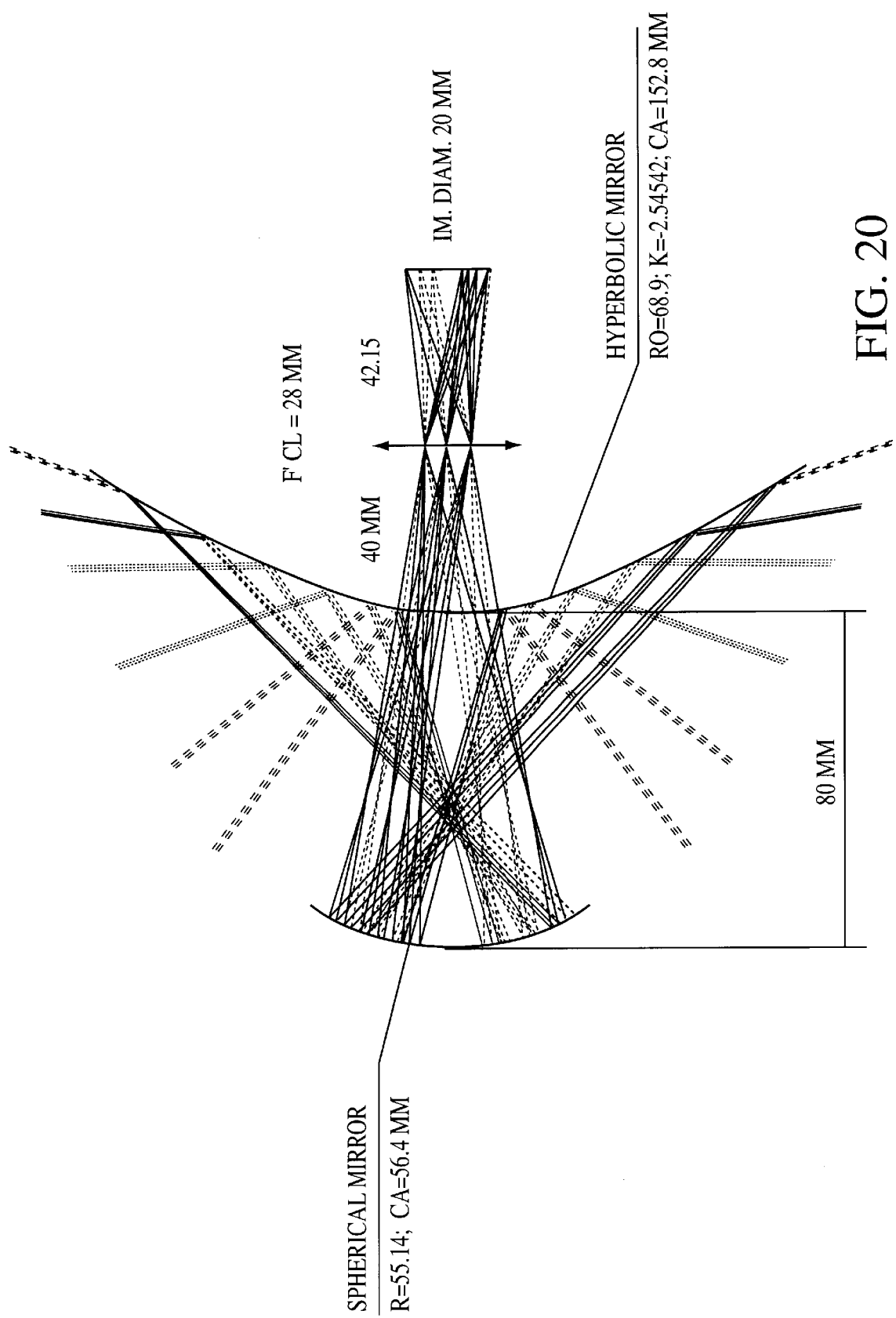
FIG. 20 Illustrates an embodiment according to the invention that has a two mirror system, comprising a primary hyperboloidal truncated reflector and a secondary spherical reflector.

FIG. 20 shows an exemplary arrangement that is similar to the third embodiment, in which the two mirror system comprises a primary hyperboloidal truncated reflector and a secondary spherical reflector. The shapes of the two reflectors are different from the third exemplary embodiment. As in the third example, system field of view is 220 degrees in the vertical plane, but image diameter is 20 mm, almost six times more than in the third example. Focal length is −5.5 mm, F number is 4, relay focal length is 28 mm, and back focal length is 42.15 mm. The two mirror system fits as an attachment to single lens reflex or digital cameras to provide about five times higher resolving power than in the third example.

6.10. Example Ten

Figure 21:
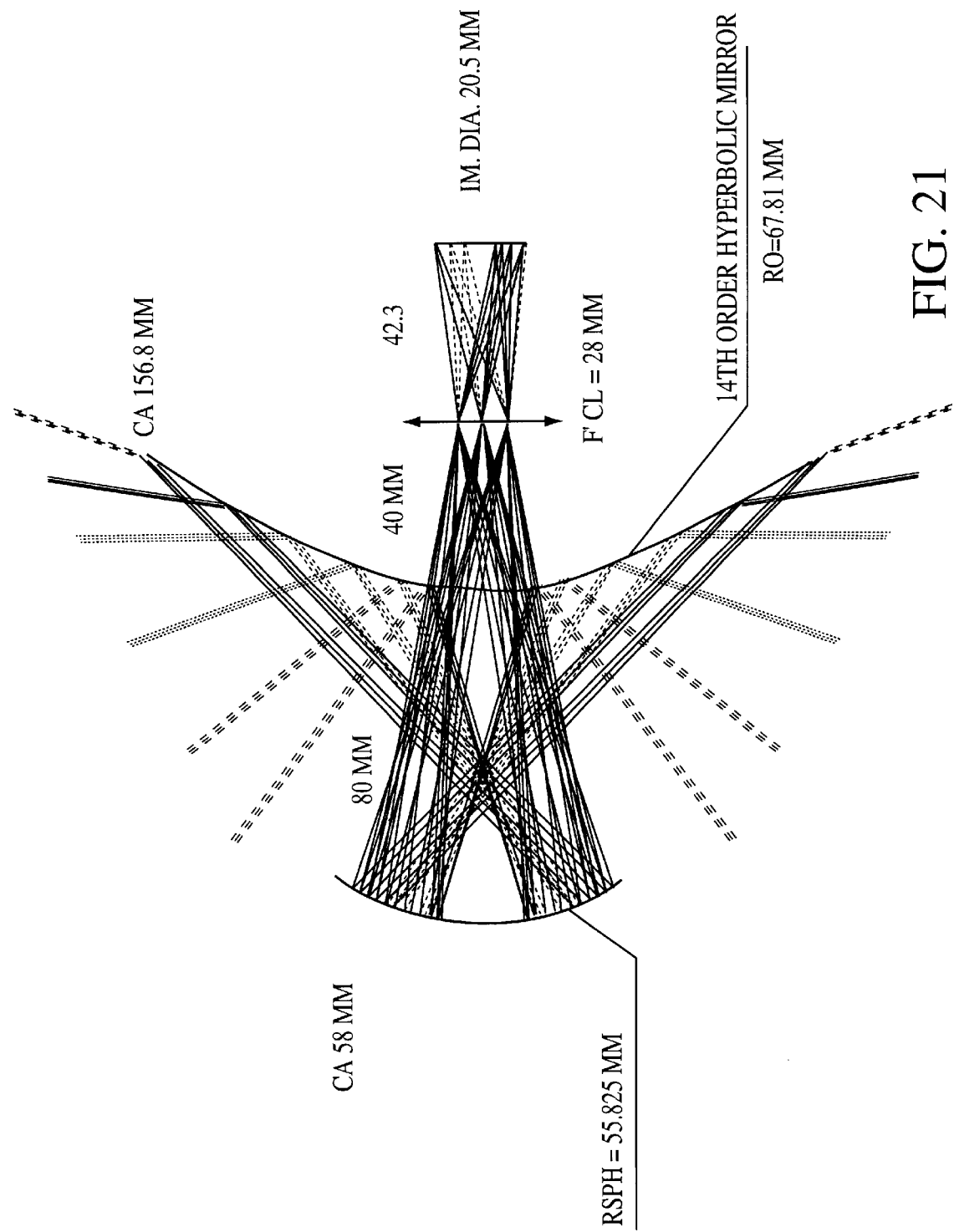
FIG. 21 Illustrates an embodiment of an apparatus according to the invention, having a primary truncated reflector that is a higher order hyperboloidal surface of revolution, and having a secondary spherical reflector.

FIG. 21 shows an exemplary arrangement which is similar to the ninth embodiment, the primary difference being that the primary reflector is a $14^{th}$ order hyperboloidal surface of revolution.

6.11. Example Eleven

Figure 22:
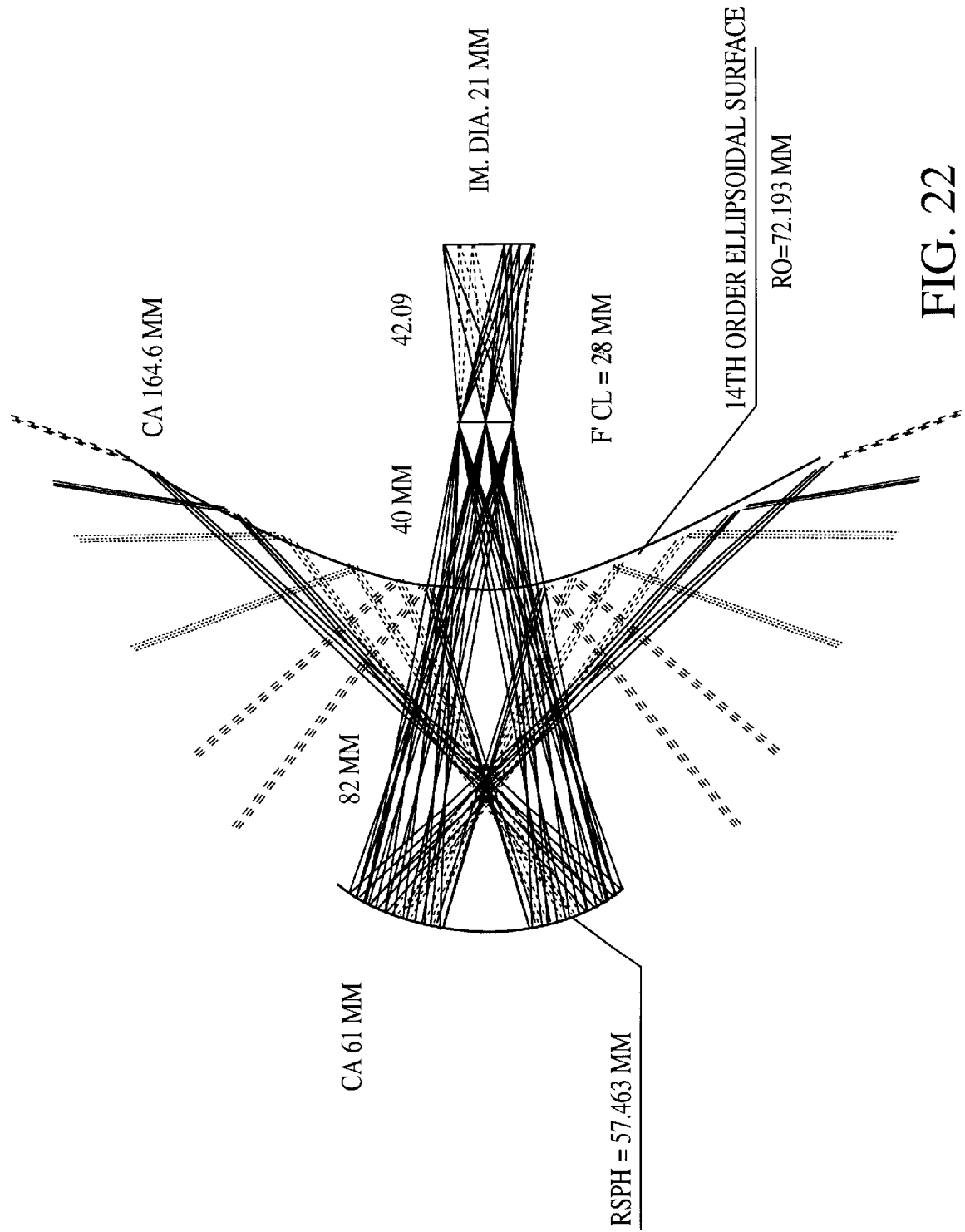
FIG. 22 Illustrates an embodiment having a primary truncated reflector that is a higher order ellipsoidal surface of revolution, and having a secondary spherical reflector.

FIG. 22 shows an exemplary arrangement which is similar to the tenth embodiment, the primary difference being that the primary reflector is a $14^{th}$ order ellipsoidal surface of revolution.

Accordingly, the invention also includes a novel method for designing a panoramic imaging apparatus. The commercial goal of methods for the design of a panoramic system or panoramic apparatus is to define a system's optical and packaging parameters, which will provide general specification characteristics and appropriate optical image quality.

We have discovered a new proprietary method for designing a super wide-angle panoramic imaging apparatus with a 360° horizontal field of view and up to 260° vertical field of view. The apparatus comprises at least four elements: a two-mirror subsystem, a relay system and an image sensor. The method is based on three well-known statements from analytical geometry and optical system design related to the conic section curves and surfaces of revolution produced by these curves. From analytical geometry it is well-known about a specific feature of their focal points. Using conic surfaces as reflectors, we have two aberration free conjugate points, their geometrical foci. This means the two foci are perfect conjugate points. All rays from one focus pass through the other after reflection by the surface. Because both points lie on the optical axis, spherical aberration is absent in full. Combining two conic reflective surfaces we will keep this feature. Putting entrance and exit pupils of the optical system at these points will produce a single view point for the whole system. We can do this by putting a real diaphragm at one geometrical focus or by optically project hardware aperture of camera lens like in U.S. Pat. No. 5,760,826 to Nayar.

The second well-known statement from geometry tells us about a stigmatic image of the entire field of view for any object positions, if we put pupils in the geometrical foci (M. M. Rusinov, Technical Optics, Mashinostroenie, Leningrad, 1979, p. 250). This allowed building an anastigmatic panoramic imaging apparatus with a single viewpoint using a parabolic mirror, a relay lens and a standard camera lens. Such an apparatus is described in U.S. Pat. No. 5,760,826 to Nayar. A disadvantage of the apparatus disclosed in that patent is a field curvature of the image, which is created by the parabolic mirror.

Due to optical system theory, to make an image plane flat we have to correct Petzval's curvature in the optical system, i.e., to make Petzval's sum zero. In a two mirror system, for example, we have simply to use concave and convex mirrors with equal radii of curvatures (Virendra N. Mahajan, Optical Imaging and Aberrations, SPIE Press, 1998, p. 375). This will provide image curvature correction in third order approximation, i.e., close to the optical axis. In super wide-angle systems it is not enough to correct only Petzval's curvature to make an image plane flat, because of existing field curvature of the high orders.

Nevertheless, the present inventors have discovered that it is possible to provide a "self-correcting" reflection of a scene, which is substantially free of optical aberrations of major concern in super wide-angle systems (namely, astigmatic effects and field curvature effects; there are, of course other optical aberrations, such as coma and chromatic effects, but these are of lesser concern) in a two-mirror system using the optical powers of the mirrors (or reflectors), their conic constants, and the distance between them. We have developed a proprietary method for designing high quality, super wide-angle Panoramic Imaging Systems with 360° horizontal field of view and up to about 280° vertical field of view. In addition, another optical aberration, namely, spherical effects are largely eliminated in the present invention by adopting a confocal arrangement that also provides a substantially single reference viewpoint.

There are two basic steps in this method: 1) analytical calculation of the initial variant parameters, 2) optimization of the initial variant, using optical design programs. If the output of the second step leaves something to be desired, the first step should be repeated for as many repetitions as necessary, to achieve the image quality desired. It is to be understood that some optical design software, like CODE V, ZEMAX, OSLO or other commercial programs, can be used on the second step.

To calculate initial parameters the analytical formulae were worked out and programmed.

In general, an inventive imaging apparatus contains four components: two reflectors or mirrors, a relay system and a sensor. For the specific example we used a CCD as a sensor, and a camera lens as a relay system. To start our calculations, the general specification characteristics should be defined in advance. They are CCD size, camera lens focal length, and field of view in the vertical object space plane. We introduce in the program the radius of the image circle on CCD-plane rim. It is equal to half-vertical CCD size, F'cl is a camera focal length, β1 is half field of view angle in the object space. Further, we have to introduce the camera lens position relative to the first mirror vertex d21. More precisely, it is a distance from the first mirror vertex and the camera lens entrance pupil (positive number), and radii of curvatures at the $1^{st}$ and $2^{nd}$ mirror vertexes (both radii of curvature are positive and approximately equal to each other as a first approximation for field curvature correction). It is a well-known fact that field curvature equals zero in the third order approximation (i.e., around optical axis or for moderate field of view angles) if both radii of curvature in two mirror system are equal to each other, and one of them is convex and the other one is concave. Radii of curvatures of the $1^{st}$ mirror play a role of a scaling factor, so actually, one has to introduce only two packaging data d21sc and R2sc. The last number is a linear magnification of a camera lens. It is an iteration parameter, because one does not know it in advance. For the first approximation one can put it equal to zero, as if the camera lens works from infinity.

As a result, one gets four solutions with different combinations of conic surfaces of revolution. One such solution utilizes a first hyperboloidal mirror and a second ellipsoidal mirror. As stated already, if the initial solutions are found unsatisfactory for some reason, one could repeat the calculations, changing radii of mirror curvatures and camera lens location, for example.

To get the final system parameters one has to make computer optimization of the initial variant, which is only a simple technical procedure apparent to one of ordinary skill in the art. A further illustration of the invention is provided in Appendix B, attached hereto ("Catadioptric Panoramic Imaging System Design-and Catadioptric Panoramic Imaging System Design-IT").

As a result, one can develop different kinds of super wide-angle panoramic imaging apparatuses (FIGS. 1–22) with vertical field of view from about 200° to about 260°. In the first example (FIG. 1) we have a strictly stigmatic system with strictly a single viewpoint and substantially complete field curvature correction over the entire field of view (FIG. 2A). In the Example Four (FIG. 10) we have even higher level of field curvature correction, introducing in the system very small amounts of astigmatism (less than 5 micrometers, FIG. 11A). Tangential curve has three zeros, and non-flatness 1 micrometer. Sagittal curve has two zeros, and less than 5 micrometers non-flatness.

When attempting to obtain Petzval's curvatures of all examples provided, all the values obtained are non-zero. (See, for example, Appendix A, attached hereto.) This result confirms the fact that it is not enough to correct Petzval's curvature in the super wide-angle system to get image plane flatness. Instead, the shapes and sizes of the primary and secondary reflectors have to be set, estimated and/or optimized to obtain a reflection that is substantially free of the major optical aberrations of concern to the super wide-angle system technologist.

The present invention is not to be limited in scope by the examples and embodiments disclosed herein, which are intended as single illustrations of one aspect of the invention, and any which are functionally equivalent are within the scope of the invention. Indeed, various modifications of the invention, in addition to those shown and described herein, will become apparent to those skilled in the art from the foregoing description. Such modifications are intended to fall within the scope of the appended claims. All patents and any publications mentioned herein are hereby incorporated by reference.

APPENDIX A

Petzval's curvature of two mirror systems

1) Initial data:
   - R1 := 20.32 mm — Radius of curvature of the first mirror
   - R2 := 17.2795 mm — Radius of curvature of the second mirror
   - D1 := −28.00 mm — Distance from the 1st mirror to the 2nd on (always negative)

Calculations:
   $$\rho\text{pscale} := -\left(1 + \frac{2 \cdot D1}{R2 - R1}\right)^{-1} \quad \rho\text{pscale} = -0.0515 \text{ (normalized to focal length: F' = 1)}$$

2) Initial data:
   - R1 := 20.32 mm — Radius of curvature of the first mirror
   - R2 := 17.8114 mm — Radius of curvature of the second mirror
   - D1 := −28.6969 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = -0.04188 \text{ (normalized to focal length: F' = 1)}$$

3) Initial data:
   - R1 := 20.32 mm — Radius of curvature of the first mirror
   - R2 := 20.354 mm — Radius of curvature of the second mirror
   - D1 := −50.0 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = 3.40116 \times 10^{-4} \text{ (normalized to focal length: F' = 1)}$$

4) Initial data:
   - R1 := 20.32 mm — Radius of curvature of the first mirror
   - R2 := 24.13668 mm — Radius of curvature of the second mirror
   - D1 := −60.0 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = 0.03285 \text{ (normalized to focal length: F' = 1)}$$

5) Initial data:
   - R1 := 22.7184 mm — Radius of curvature of the first mirror
   - R2 := 36.7071 mm — Radius of curvature of the second mirror
   - D1 := −51.913 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = -0.15571 \text{ (normalized to focal length: F' = 1)}$$

6) Initial data:
   - R1 := 24.2623 mm — Radius of curvature of the first mirror
   - R2 := 20.5179 mm — Radius of curvature of the second mirror
   - D1 := −35.0002 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = -0.05078 \text{ (normalized to focal length: F' = 1)}$$

7) Initial data:
   - R1 := 25.6583 mm — Radius of curvature of the first mirror
   - R2 := 32.1506 mm — Radius of curvature of the second mirror
   - D1 := −50.0 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = 0.06943 \text{ (normalized to focal length: F' = 1)}$$

8) Initial data:
   - R1 := 68.9 mm — Radius of curvature of the first mirror
   - R2 := 55.14 mm — Radius of curvature of the second mirror
   - D1 := −80.0 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = -0.07919 \text{ (normalized to focal length: F' = 1)}$$

9) Initial data:
   - R1 := 67.81 mm — Radius of curvature of the first mirror
   - R2 := 55.825 mm — Radius of curvature of the second mirror
   - D1 := −80.0 mm — Distance from the 1st mirror to the 2nd one (always negative)

Calculations:
   $$\rho\text{pscale} := -\left(1 + \frac{2 \cdot D1}{R2 - R1}\right)^{-1} \quad \rho\text{pscale} = -0.06969 \text{ (normalized to focal length: F' = 1)}$$

APPENDIX A-continued

Petzval's curvature of two mirror systems

10) Initial data:
R1 := 72.193 mm    Radius of curvature of the first mirror
R2 := 57.463 mm    Radius of curvature of the second mirror
D1 := −82.0 mm    Distance from the 1st mirror to the 2nd one
(always negative)

Calculations:

$$\rho\text{pscale} := -\left(1 + \frac{2 \cdot D1}{R2 - R1}\right)^{-1} \quad \rho\text{pscale} = -0.08241 \text{ (normalized to focal length: } F' = 1\text{)}$$

APPENDIX B

Catadioptric panoramic imaging system design - I

CPIS contains 1st hyperbolic mirror, 2nd elliptical mirror, camera lens and CCD detector
Initial Data:
1.1. General Spec Characteristics
Radius of image circle on CCD-plane (half vertical CCD size):    Rim := 1.8
Camera lens focal length:    F'c1 := 6.0
Half Field of View angle in object space:    β1 := 100
1.2. Specific three (two) linear data of 2-mirror system
Radii of curvatures at the 1st and 2nd mirror's vertexes:    R1 := 15.0217    R2 := 17.0217
(both positive and can be equal for Petzval's curvature correction)
Distance between the 1st mirror vertex and camera lens entrance pupil:    d21 := 5.667649
Iteration parameter - linear magnification of a camera lens:    m := −0.33204555

Calculations: Scaling $$d21sc := \frac{d21}{R1} \quad R2sc := \frac{R2}{R1}$$

$$\beta 3 := -\text{atan}\left[\frac{Rim}{(1-m) \cdot F'c1}\right] \cdot \frac{180}{\pi} \quad\quad Mp := \frac{\tan(\beta 1 \cdot \frac{\pi}{180})}{\tan(\beta 3 \cdot \frac{\pi}{180})}$$

$$C1 := \frac{1}{(1 - Mp) \cdot \cos(\beta 1 \cdot \frac{\pi}{180})} \quad C2 := \frac{1 + Mp}{1 - Mp} \quad\quad a1 := -C1 + \sqrt{C1^2 - C2}$$

$$C1 := \frac{1}{(1 - Mp) \cdot \cos(\beta 1 \cdot \frac{\pi}{180})} \quad\quad b := \frac{a1 + (1 - a1) \cdot d21sc}{1 - (1 - a1) \cdot d21sc}$$

$$\varepsilon 22 := -a - \sqrt{a^2 - b} \quad \varepsilon 12 := \frac{1 - a1 \cdot \varepsilon 22}{a1 - \varepsilon 22} \quad d1 := \frac{R1}{1 - \varepsilon 12} - \frac{R2}{1 + \varepsilon 22} \quad d2 := \frac{R2}{1 - \varepsilon 22}$$

$$\phi 1 := \frac{-2}{R1} \quad\quad \phi 2 := \frac{2}{R2} \quad\quad \phi 3 := \frac{1}{F'c1} \quad\quad d11 := -d1$$

$$h2 := 1 - \phi 1 \cdot d11 \quad \alpha 3 := \phi 1 + \phi 2 - \phi 1 \cdot \phi 2 \cdot d11 \quad h3 := h2 - \alpha 3 \cdot d2 \quad \alpha 4 := \alpha 3 + h3 \cdot \phi 3$$

$$S'F' := \frac{h3}{\alpha 4} \quad S'F' = 7.002273 \quad\quad mr := 1 - \frac{S'F'}{F'c1} \quad mr = -0.33204556$$

Catadioptric panoramic imaging system design - II

CPIS contains 1st hyperbolic mirror, 2nd elliptical niirror, camera lens and CCD detector
Initial Data:
1.3. General Spec Characteristics
Radius of image circle on CCD-plane (half vertical CCD size):    Rim := 1.8
Camera lens focal length:    F'c1 := 6.0
Half Field of View angle in object space:    β1 := 100
1.4. Specific three (two) linear data of 2-mirror system
Radii of curvatures at the 1st and 2nd mirror's vertexes:    R1 := 15.0217    R2 := 17.0217
(both positive and can be equal for Petzval's curvature correction)
Distance between the 1st mirror vertex and camera lens entrance pupil:    d21 := 5.667649
Iteration parameter - linear magnification of a camera lens:    m := 0.33204555

Calculations: Scaling $$d21sc := \frac{d21}{R1} \quad d21sc = 0.377 \quad\quad R2sc := \frac{R2}{R1} \quad R2sc = 1.133$$

APPENDIX B-continued (Radius of curvature of the 1st hyperbolic mirror plays a role of a scaling factor, so we can introduce only two packaging data d21sc and R2sc instead of three value R1, R2 and d21)

1.5. Preliminary Calculations $$\beta3 := -\operatorname{atan}\left[\frac{\operatorname{Rim}}{(1-m)\cdot F'c1}\right]\cdot\frac{180}{\pi} \qquad \beta3 = -12.692$$

(HFOV angle in an image space - principal ray angle; negative value if $\beta1$ is positive)

$$\operatorname{Mp} := \frac{\tan(\beta1\cdot\frac{\pi}{180})}{\tan(\beta3\cdot\frac{\pi}{180})} \qquad \operatorname{Mp} = 25.181352$$

(Linear magnification in pupils: positive if $\beta1$ more than 90 degrees

1.6. Minors' Conic Constants Calculations $$C1 := \frac{1}{(1-\operatorname{Mp})\cdot\cos(\beta1\cdot\frac{\pi}{180})} \qquad C1 = 0.238$$

(Auxiliary constants - coefficients of the 1st quadratic equation)

$$C2 := \frac{1+\operatorname{Mp}}{1-\operatorname{Mp}} \qquad C2 = -1.083$$

$$\alpha1 := -C1 + \sqrt{C1^2 - C2} \qquad \alpha2 := -C1 - \sqrt{C1^2 - C2}$$

(Two solutions of the 1st quadratic equation)
First set of solutions: $\alpha0 := \alpha1$ $$a := \frac{(1-\alpha0)\cdot R2sc + 0.5\cdot(1+\alpha0)}{(1-\alpha0)\cdot d21sc - 1} \qquad a = -1.184$$

(Auxiliary constants - coefficients of the 2nd quadratic equation)

$$b := \frac{\alpha0 + (1-\alpha0)\cdot d21sc}{1 - (1-\alpha0)\cdot d21sc} \qquad b = 0.955$$

First solution:

$$\varepsilon21 := -a + \sqrt{a^2 - b} \qquad \varepsilon21 = 1.853 \qquad k21 := -\varepsilon21^2 \qquad k21 = -3.435$$
(conic constant of the 2nd mirror)

$$\varepsilon11 := \frac{1-\alpha0\cdot\varepsilon21}{\alpha0 - \varepsilon21} \qquad \varepsilon11 = 0.524 \qquad k11 := \varepsilon11^2 \qquad k11 = -0.275$$
(conic constant of the 1st mirror)
$\varepsilon11 \cdot 1/\varepsilon21 = 0.972$ Second solution:

$$\varepsilon22 := -a - \sqrt{a^2 - b} \qquad \varepsilon22 = 0.515 \qquad k22 := -\varepsilon22^2 \qquad k22 = -0.265647$$
(conic constant of the 2nd mirror)

$$\varepsilon12 := \frac{1-\alpha0\cdot\varepsilon22}{\alpha0 - \varepsilon22} \qquad \varepsilon12 = 1.824 \qquad k12 := -\varepsilon12^2 \qquad k12 = -3.32769$$
(conic constant of the 1st mirror)
$\varepsilon22 \cdot \varepsilon12 = 0.94$

*) To get the second set of solutions we have to put $\alpha0$ equals to $\alpha2$; solutions with negative eccentricities are invalid.
**) Conic constant k from 0 to -1 defines ellipsoid; less than -1 defines hyperboloid.
Optical system packaging parameters   $\varepsilon12 = 1.824$   $\varepsilon22 = 0.515$

1.7. Foci points positions $$Z1n := \frac{R1}{1+\varepsilon12} \quad Z1f := \frac{R1}{1-\varepsilon12} \quad Z2n := \frac{R2}{1+\varepsilon22} \quad Z2f := \frac{R2}{1-\varepsilon22}$$

$Z1n = 5.319$   $Z1f = -18.226$   $Z2n = 11.232$   $Z2f = 35.126$

Camera lens position from the 1st mirror vertex   $d21c := Z2f - Z2n + Z1f$   $d21c = 5.668$
Distance between the 1st and the 2nd mirrors (always negative)   $d1 := Z1f - Z2n$   $d1 = -29.458$
Distance between the 2nd mirror and a camera lens   $d2 := Z2f$   $d2 = 35.126$ First mirror diameter $$D1(\beta1) := \frac{2\cdot R1\cdot\sin(\beta1\cdot\frac{\pi}{180})}{1+\varepsilon12\cdot\cos(\beta1\cdot\frac{\pi}{180})} \qquad D1(\beta1) = 43.304$$

APPENDIX B-continued

HFOV angle after the first mirror:
$$\phi 1 := \frac{-2}{R1}$$

$$\beta 2(100) = -38.355$$

Second mirror diameter
$$D2(\beta 2) := \frac{-2 \cdot R2 \cdot \sin(\beta 2 \cdot \frac{\pi}{180})}{1 + \varepsilon 22 \cdot \cos(\beta 2 \cdot \frac{\pi}{180})}$$

$$D2(\beta 2(\beta 1)) = 154.044$$

Diameter of the first mirror hole
$$a1 := \frac{R1 + d21 \cdot \tan(\beta 3 \cdot \frac{\pi}{180})^2}{1 + k12 + \tan(\beta 3 \cdot \frac{\pi}{180})^2} \qquad b1 := \frac{(d21 \cdot \tan(\beta 3 \cdot \frac{\pi}{180}))^2}{1 + k12 + \tan(\beta 3 \cdot \frac{\pi}{180})^2}$$

$$x1 := -a1 + \sqrt{a1^2 + b1} \qquad x2 := -a1 - \sqrt{a1^2 + b1} \qquad x0 := x2 \qquad x0 = 0.053$$

$$Dhole := -2 \cdot (d21 - x0) \cdot \tan(\beta 3 \cdot \frac{\pi}{180}) \qquad Dhole = 2.529 \text{ (diameter of the 1st mirror hole)}$$

Blind spot due to the hole in the 1st mirror:
$$f(x) := \frac{2 \cdot R1 \cdot \sin(x \cdot \frac{\pi}{180})}{1 + \varepsilon 12 \cdot \cos(x \cdot \frac{\pi}{180})} - Dhole$$

$x := 13$ $\qquad$ soln := root(f(x), x) $\qquad$ $2 \cdot$ soln = 27.005 degrees by solving equation Additional calculations and graphics Maximum possible half field of view angle:
$$\beta 1 max := \arccos\left(\frac{-1}{\varepsilon 12}\right) \cdot \frac{180}{\pi} \qquad \beta 1 max = 123.243$$

Half Field of View angle (in object space): $\quad \beta 1 := 0, 5 \ldots 130$

Field of view angle after first mirror:
$$\beta 2(\beta 1) := \operatorname{atan}\left[\frac{(1 - \varepsilon 12^2) \cdot \sin(\beta 1 \cdot \frac{\pi}{180})}{2 \cdot \varepsilon 12 + (1 + \varepsilon 12^2) \cdot \cos(\beta 1 \cdot \frac{\pi}{180})}\right] \cdot \frac{180}{\pi}$$

Maximum working HFOV angle: $\qquad \beta 1w := 100$ $$\beta 1 := 0, \frac{\beta 1w}{100} \ldots \beta 1w + 10 \qquad D1(\beta 1w) = 43.304 \quad D1(110) = 75.066$$

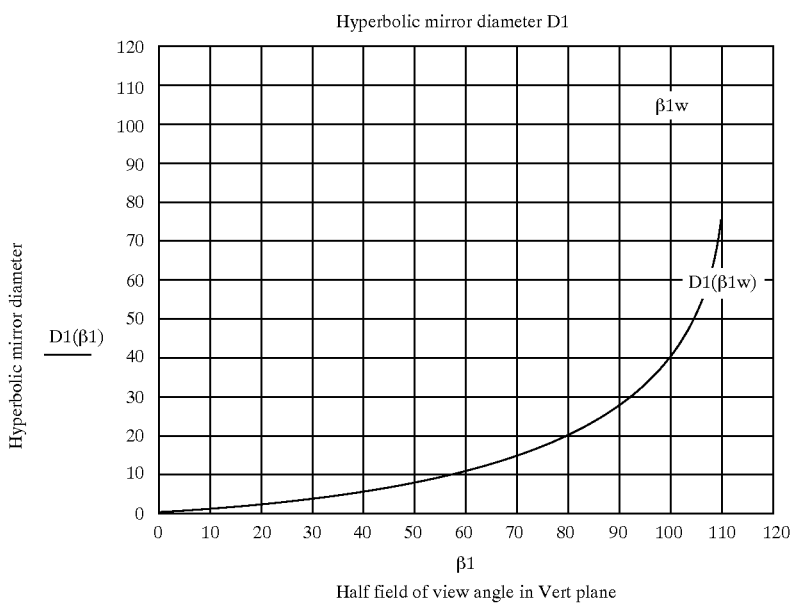

Hyperbolic mirror diameter D1

Half field of view angle in Vert plane

APPENDIX B-continued

Paracamera focal and back focal length evaluation:

Optical powers of the optical components:
$$\phi 1 := \frac{-2}{R1} \qquad \phi 2 := \frac{2}{R2} \qquad \phi 3 := \frac{1}{Fc1}$$

$d11 := -d1$
$\alpha 2 := \phi 1$
$\alpha 3 := \phi 1 + \phi 2 - \phi 1 \cdot \phi 2 \cdot d11 \qquad h3 := h2 - \alpha 3 d2$
$\alpha 4 := \alpha 3 + h3 \cdot \phi 3$ $h2 = 1 - \alpha 2 \cdot d11$ $\Phi pc := \alpha 4$ $$Fpc := \frac{1}{\Phi pc} \qquad F'pc = -0.746$$

$$S'F' := \frac{h3}{\alpha 4} \qquad S'F' = 7.992273$$

$$m := 1 - \frac{S'F'}{F'c1} \qquad m = -0.332046$$

Hyperboloidal mirror half axes
$$ah := -\frac{R1}{1+k12} \qquad ah = 6.453 \qquad k12 = -3.328$$

$$bh := -\frac{R1}{\sqrt{-1-k12}} \qquad bh = 9.846$$

Ellipsoidal mirror half axes
$$ae := -\frac{R2}{1+k22} \qquad ae = 23.179 \qquad k22 = -0.266$$

$$be := -\frac{R2}{\sqrt{1+k22}} \qquad be = 19.863$$

$B := \epsilon 12 + \epsilon 22 \qquad A := 1 + \epsilon 12 \cdot \epsilon 22$

Half Field of View angle after the 2nd mirror:
$$\beta 3(\beta 1) := \operatorname{atan}\left[\frac{(A^2 - B^2) \cdot \sin\left(\beta 1 \cdot \frac{\pi}{180}\right)}{2 \cdot A \cdot B + (A^2 + B^2) \cdot \cos\left(\beta 1 \cdot \frac{\pi}{180}\right)}\right] \cdot \frac{180}{\pi}$$

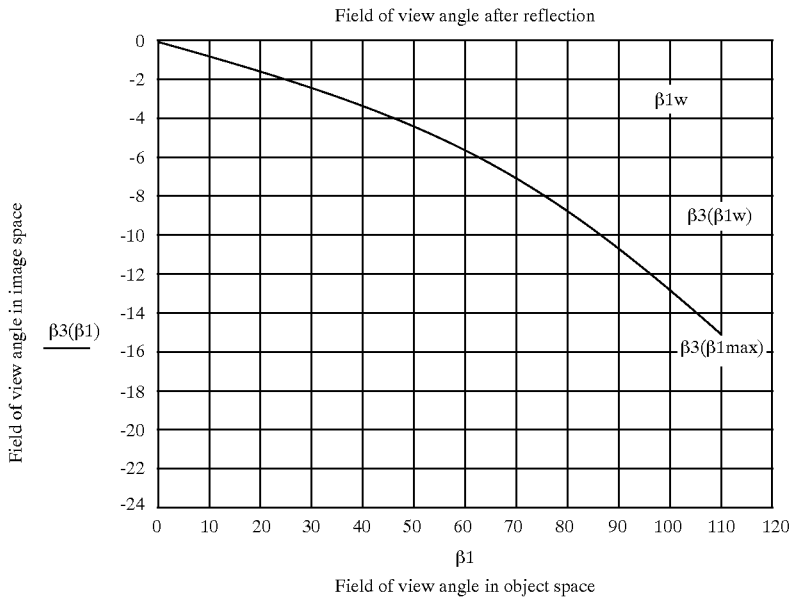

Field of view angle after reflection $\beta 1w = 100 \qquad \beta 1max = 123.243 \qquad D2 := D2(\beta 2(100))$
$D2 = 15.044 \qquad D1 := D1(100) \qquad D1 = 43.304$
$R1 = 15.0217 \qquad k12 = -3.32769 \qquad \qquad D1 = 43.304$
$\qquad\qquad\qquad\qquad\qquad\qquad\qquad d1 = -29.458299$
$R2 = 17.0217 \qquad k22 = -0.265647 \qquad\qquad\qquad D2 = 15.044$
$\qquad\qquad\qquad\qquad\qquad\qquad\qquad d2 = 35.125948$
$d21 = 5.667649$

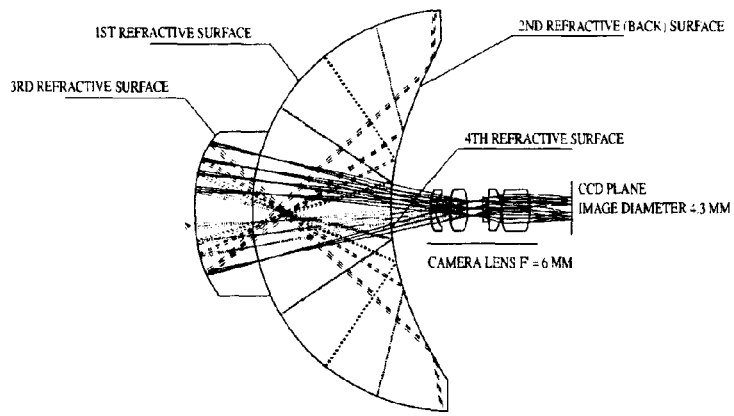

What is claimed is:

1. A panoramic imaging apparatus for sensing a super wide-angle field of view comprising:
   (a) a pair of reflectors, including (i) a primary reflector having a first shape and a first size and capable of providing a first reflection of a super wide-angle scene, and (ii) a secondary reflector having a second shape and a second size, which is positioned to accept the first reflection to provide a second reflection at a first location, the shapes and sizes of the primary and secondary reflectors, and their respective positions, are such that the second reflection provided at the first location is substantially free of field curvature effects and astigmatic effects;
   (b) a relay system positioned to accept the second reflection and comprising optics capable of substantially filtering out optical rays other than those reflected directly by the secondary reflector from incoming optical rays reflected directly by the first reflector to provide a filtered reflection; and
   (c) an image sensor positioned to accept the filtered reflection, in which the panoramic imaging apparatus captures the super wide-angle scene from a substantially single reference viewpoint.

2. The panoramic imaging apparatus of claim 1 in which the relay system includes optics capable of relocating a reflection at a first location to a second location to provide a relocated reflection.

3. The panoramic imaging apparatus of claim 1 in which the second reflection is substantially flat and stigmatic.

4. The panoramic imaging apparatus of claim 1 in which the primary reflector is convex and the secondary reflector is concave.

5. The panoramic imaging apparatus of claim 1 in which the primary reflector is substantially hyperboloid and the secondary reflector is substantially ellipsoid.

6. The panoramic imaging apparatus of claim 1 in which the image sensor comprises photographic film.

7. The panoramic imaging apparatus of claim 1 in which the image sensor comprises a CCD image sensor.

8. The panoramic imaging apparatus of claim 1 in which the image sensor comprises a CMOS image sensor.

9. The panoramic imaging apparatus of claim 1 in which the image sensor comprises a video camera.

10. The panoramic imaging apparatus of claim 1 in which the relay system is positioned such that the primary reflector is between the secondary reflector and the relay system.

11. The panoramic imaging apparatus of claim 1 in which the relay system comprises a pinhole.

12. The panoramic imaging apparatus of claim 1 in which the relay system comprises at least one lens.

13. The panoramic imaging apparatus of claim 1 in which the relay system comprises at least one mirror.

14. The panoramic imaging apparatus of claim 1 in which the primary reflector comprises a substantially hyperboloidal mirror having a surface that substantially obeys the equation expressed in cylindrical coordinates, $r^2=2R_1z-(1+k_1)z^2$, where z is the coordinate along the optical axis, r is the radial coordinate, $R_1$ is the radius of curvature at the vertex of the conic that forms the primary reflector and $k_1$ is the conic constant of the primary reflector.

15. The panoramic imaging apparatus of claim 1 in which the primary reflector has an axis of rotation, comprises a mirror truncated at a plane that is substantially perpendicular to the axis of rotation and further has a near focal point and a far focal point.

16. The panoramic imaging apparatus of claim 1 in which the secondary reflector comprises a substantially ellipsoidal or spherical mirror having a surface which substantially obeys the equation expressed in cylindrical coordinates, $r^2=2R_2z-(1+k_2)z^2$, where z is the coordinate along the optical axis, r is the radial coordinate, $R_2$ is the radius of curvature at the vertex of the conic that forms the secondary reflector and $k_2$ is the conic constant of the secondary reflector.

17. The panoramic imaging apparatus of claim 1 in which the secondary reflector has an axis of rotation, which is substantially coincident with the axis of rotation of the primary reflector, comprises a mirror truncated at a plane which is substantially perpendicular to the axis of rotation of the secondary reflector and further has a near focal point and a far focal point.

18. The panoramic imaging apparatus of claim 1 in which a position of the near focal point of the secondary reflector is substantially coincident with a position of the far focal point of the primary reflector.

19. The panoramic imaging apparatus of claim 1 in which the relay system is positioned along the axis of rotation of the primary reflector and the secondary reflector.

20. The panoramic imaging apparatus of claim 1 in which the image sensor is positioned along the axis of rotation of the primary reflector and the secondary reflector.

21. The panoramic imaging apparatus of claim 1 further comprising a transparent mechanical support, which maintains the relative positions of the primary reflector, the secondary reflector, the relay system and the image sensor.

22. The panoramic imaging apparatus of claim 2 in which the image sensor provides an image signal representative of the relocated reflection and which apparatus further comprises an image signal processor that is coupled to the image sensor to convert the image signal into image signal data and to map the image signal data into a Cartesian coordinate system.

23. The panoramic imaging apparatus of claim 1 in which the image signal processor further includes an interpolator for providing interpolated image data, such that the interpolated image data and the image signal are combined to form a digital image.

24. The panoramic imaging apparatus of claim 1 in which the primary and secondary reflectors include back reflective mirrored surfaces of a solid transparent optical block.

25. The panoramic imaging apparatus of claim 24 in which the transparent block has at least one hole or groove.

26. The panoramic imaging apparatus of claim 25 in which the at least one hole or groove has an axis that coincides with an optical axis of the primary and secondary reflectors.

27. A method of providing a substantially stigmatic reflection of a super wide-angle field of view captured from a substantially single reference viewpoint comprising:
   (a) providing a primary reflector to generate a first reflection of a super wide-angle scene, the primary reflector having a near focal point and a far focal point;
   (b) providing a secondary reflector to accept the first reflection and to generate a second reflection, the secondary reflector having a near focal point and a far focal point;
   (c) providing a relay system having an entrance pupil, in which the primary reflector, secondary reflector and lens are positioned such that the far focal point of the primary reflector coincides substantially with the near focal point of the secondary reflector and the entrance pupil of the relay system coincides substantially with the far focal point of the secondary reflector.

28. The method of claim 27 in which rays of light of the second reflection pass through a hole in the primary reflector and meet substantially at a single point on the optical axis of the primary reflector.

29. The method of claim 27 which further comprises substantially filtering out optical rays other than those reflected directly by the secondary reflector from incoming optical rays reflected directly by the first reflector to provide a filtered reflection.

30. The method of claim 27 which further comprises propagating the second reflection through the relay system to generate a relocated reflection.

31. The method of claim 29 which further comprises propagating the filtered reflection through the relay system to generate a relocated reflection.

32. The method of claim 30 which further comprises sensing the relocated reflection.

33. The method of claim 31 which further comprises sensing the relocated reflection.

34. The method of claim 27 in which the primary reflector and the secondary reflector have shapes and sizes that give rise to a second reflection that is substantially free of field curvature effects.

35. A panoramic imaging apparatus for sensing a super wide-angle field of view comprising:
   (a) a pair of reflectors, including (i) a primary reflector having a first shape and a first size and capable of providing a first reflection of a super wide-angle scene, and (ii) a secondary reflector having a second shape and a second size, which is positioned to accept the first reflection to provide a second reflection at a first location, the shapes and sizes of the primary and secondary reflectors, and their respective positions, are such that the second reflection provided at the first location is substantially free of field curvature effects and astigmatic effects;
   (b) a relay system comprising optics capable of relocating the second reflection to a second location to provide a relocated reflection; and
   (c) an image sensor positioned to accept the relocated reflection at the second location, in which the panoramic imaging apparatus captures the super wide-angle scene from a substantially single reference viewpoint.

36. The panoramic imaging apparatus of claim 35 in which the relay system includes optics capable of substantially filtering out optical rays other than those reflected directly by the secondary reflector from incoming optical rays reflected directly by the first reflector.

37. A method of providing a substantially planar and stigmatic reflection of a super wide-angle field of view captured from a substantially single reference viewpoint comprising:
   (a) providing a primary reflector having a first shape and a first size to generate a first reflection of a super wide-angle scene; and
   (b) providing a secondary reflector having a second shape and a second size to accept the first reflection and to generate a second reflection, in which the shapes and sizes of the primary and secondary reflectors, and their respective positions, are such as to give rise to a second reflection that is substantially planar and stigmatic and in which a super wide-angle field of view is captured from a substantially single reference viewpoint.

38. The method of claim 37 which further comprises substantially filtering out optical rays other than those reflected directly by the secondary reflector from incoming optical rays reflected directly by the first reflector to provide a filtered reflection.

39. The method of claim 38 which further comprises relaying the filtered reflection to another location to provide a relocated reflection.

40. The method of claim 39 which further comprises sensing the relocated reflection.

* * * * *

UNITED STATES PATENT AND TRADEMARK OFFICE
CERTIFICATE OF CORRECTION

PATENT NO.         : 6,611,282 B1
APPLICATION NO. : 09/477415
DATED              : August 26, 2003
INVENTOR(S)        : Sergey Trubko et al.

It is certified that error appears in the above-identified patent and that said Letters Patent is hereby corrected as shown below:

The title page should be deleted and substitute therefore the attached title page.

UNITED STATES PATENT AND TRADEMARK OFFICE
CERTIFICATE OF CORRECTION

PATENT NO.       : 6,611,282 B1
APPLICATION NO. : 09/477415
DATED            : August 26, 2003
INVENTOR(S)      : Sergey Trubko et al.

It is certified that error appears in the above-identified patent and that said Letters Patent is hereby corrected as shown below:

On the Cover Page, in the figure at the bottom of the page, "2ND REFRACTIVE (BACK) SURFACE" applied to the 1st Mirror, should read --2ND REFLECTIVE (BACK) SURFACE--.
Applied to 2nd Mirror, "3RD REFRACTIVE SURFACE" should read --3RD REFLECTIVE SURFACE--.

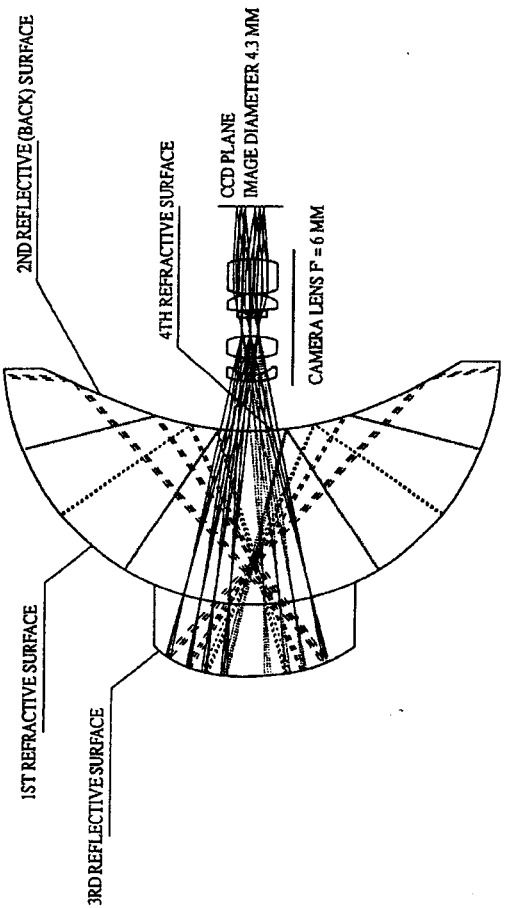

UNITED STATES PATENT AND TRADEMARK OFFICE
CERTIFICATE OF CORRECTION

PATENT NO. : 6,611,282 B1
APPLICATION NO. : 09/477415
DATED : August 26, 2003
INVENTOR(S) : Sergey Trubko et al.

It is certified that error appears in the above-identified patent and that said Letters Patent is hereby corrected as shown below:

In the drawings, Sheet 3 of 22, draw lines beneath "TS 50.00 DEG" should be added. Draw lines beneath "TS 90.00 DEG" should be added.

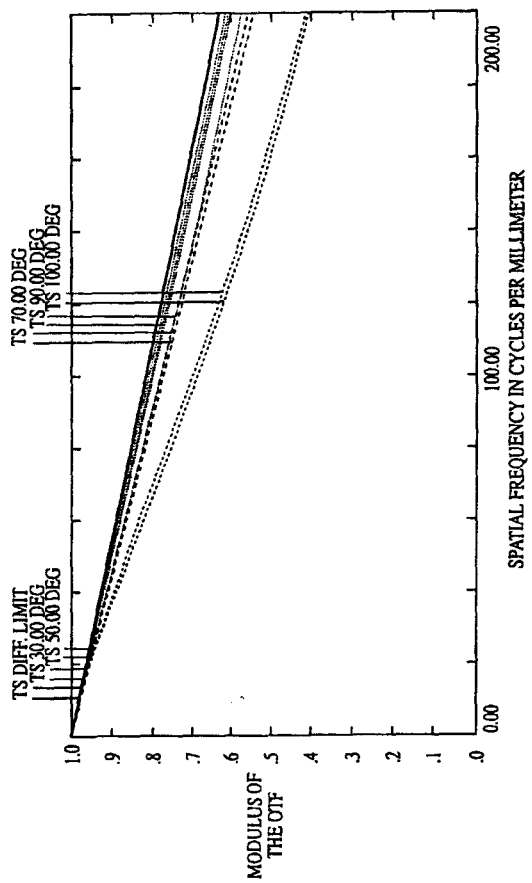

UNITED STATES PATENT AND TRADEMARK OFFICE
CERTIFICATE OF CORRECTION

PATENT NO. : 6,611,282 B1
APPLICATION NO. : 09/477415
DATED : August 26, 2003
INVENTOR(S) : Sergey Trubko et al.

It is certified that error appears in the above-identified patent and that said Letters Patent is hereby corrected as shown below:

In the drawings, Sheet 4 of 22, reference character "$F'_2$" applied to focal point of twice reflected rays should read --$F'_2$, R--

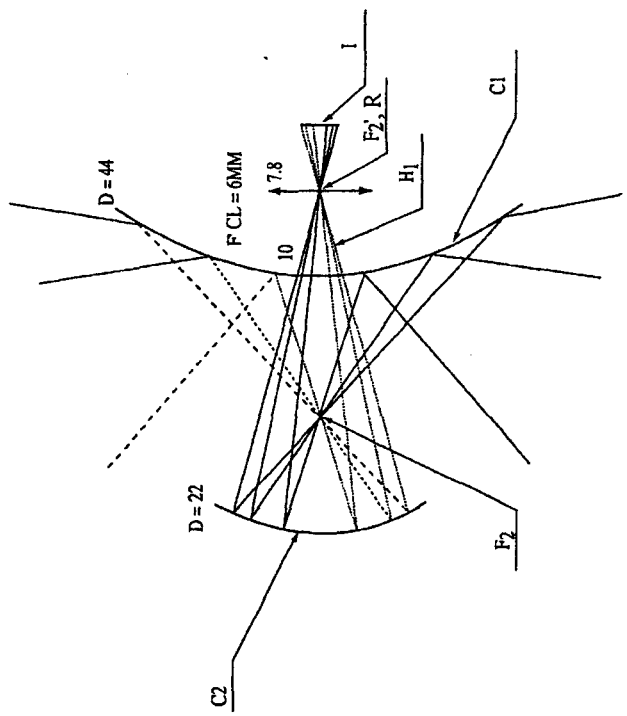

FIG. 4

UNITED STATES PATENT AND TRADEMARK OFFICE
CERTIFICATE OF CORRECTION

PATENT NO. : 6,611,282 B1  Page 5 of 14
APPLICATION NO. : 09/477415
DATED : August 26, 2003
INVENTOR(S) : Sergey Trubko et al.

It is certified that error appears in the above-identified patent and that said Letters Patent is hereby corrected as shown below:

In the drawings, Sheet 7 of 22, line applied from "Sph" should be deleted.
Line applied from "$F_2$" the intersection of reflected rays should be added.
Character "F2" applied to focusing area should read --F'2--.
Line applied from "F' C.L. = 6.25" to where rays are focused on object "F'$_2$" should be added.

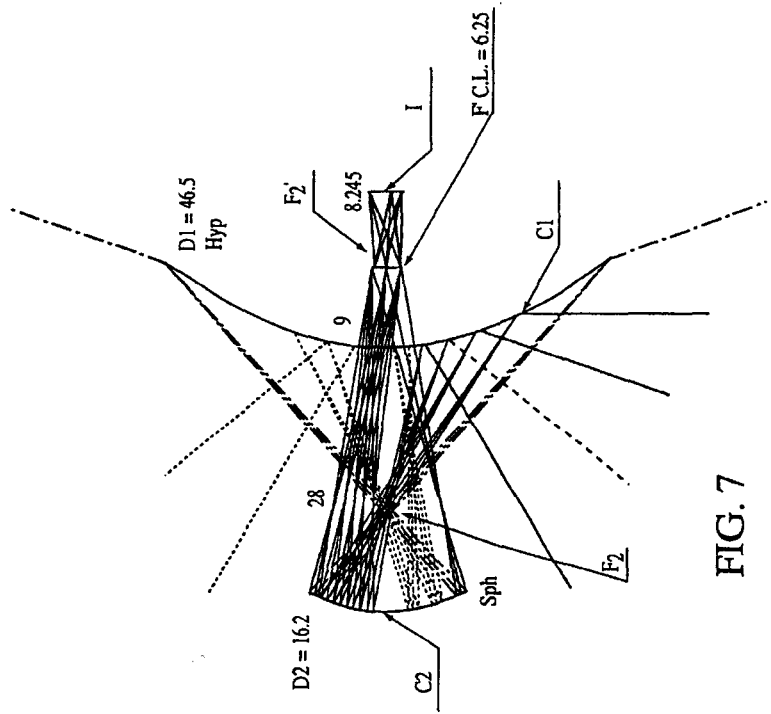

FIG. 7

UNITED STATES PATENT AND TRADEMARK OFFICE
CERTIFICATE OF CORRECTION

PATENT NO. : 6,611,282 B1
APPLICATION NO. : 09/477415
DATED : August 26, 2003
INVENTOR(S) : Sergey Trubko et al.

It is certified that error appears in the above-identified patent and that said Letters Patent is hereby corrected as shown below:

In the drawings, Sheet 9 of 22, Draw lines beneath "TS 90.00 DEG" should be added.
Draw lines beneath "TS –50.00 DEG" should be added.
Draw lines beneath "TS –30.00 DEG" should be added.

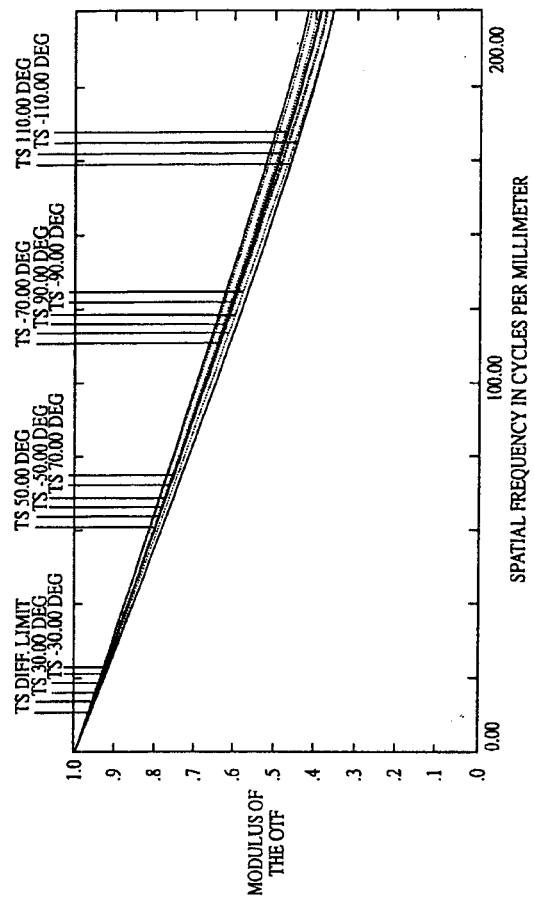

FIG. 9

UNITED STATES PATENT AND TRADEMARK OFFICE
CERTIFICATE OF CORRECTION

PATENT NO. : 6,611,282 B1
APPLICATION NO. : 09/477415
DATED : August 26, 2003
INVENTOR(S) : Sergey Trubko et al.

It is certified that error appears in the above-identified patent and that said Letters Patent is hereby corrected as shown below:

In the drawings, Sheet 10 of 22, outermost incident ray drawn from point where outermost reflected ray intersects Mirror C1.

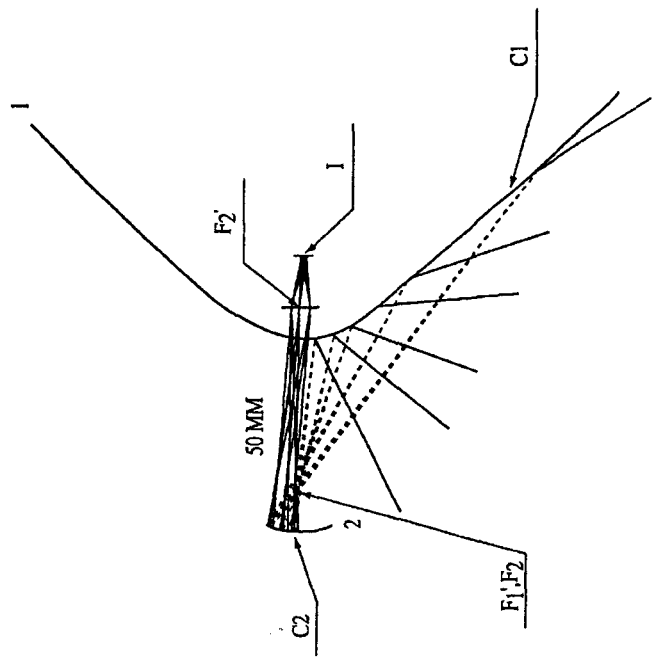

FIG. 10

UNITED STATES PATENT AND TRADEMARK OFFICE
CERTIFICATE OF CORRECTION

PATENT NO.        : 6,611,282 B1
APPLICATION NO.   : 09/477415
DATED             : August 26, 2003
INVENTOR(S)       : Sergey Trubko et al.

It is certified that error appears in the above-identified patent and that said Letters Patent is hereby corrected as shown below:

In the drawings, Sheet 12 of 22, draw lines beneath TS 50.00 DEG should be added. Draw lines beneath TS 90.00 DEG should be added.

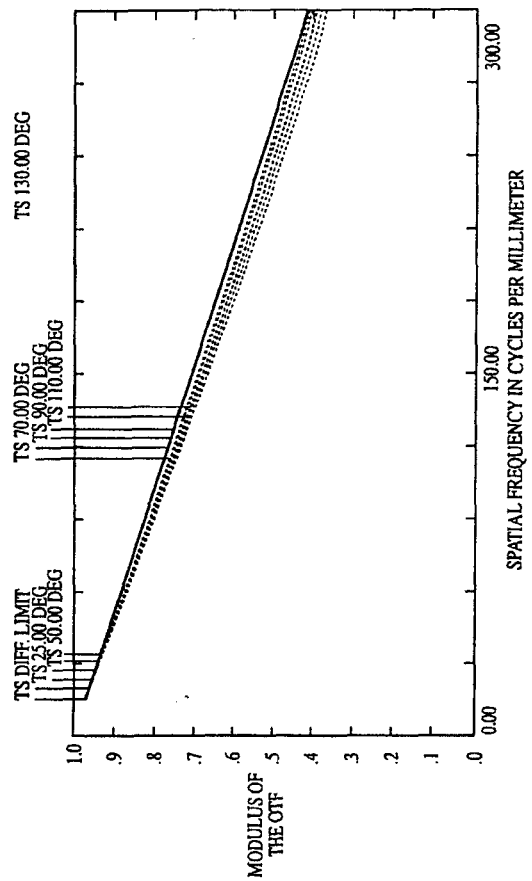

FIG. 12

UNITED STATES PATENT AND TRADEMARK OFFICE
CERTIFICATE OF CORRECTION

PATENT NO.         : 6,611,282 B1
APPLICATION NO.    : 09/477415
DATED              : August 26, 2003
INVENTOR(S)        : Sergey Trubko et al.

It is certified that error appears in the above-identified patent and that said Letters Patent is hereby corrected as shown below:

In the drawings, Sheet 14 of 22, reference number 4 should be added with arrows applied to central area of surface 2 defined by the rays entering the 3.2DI area where they intersect surface 2.

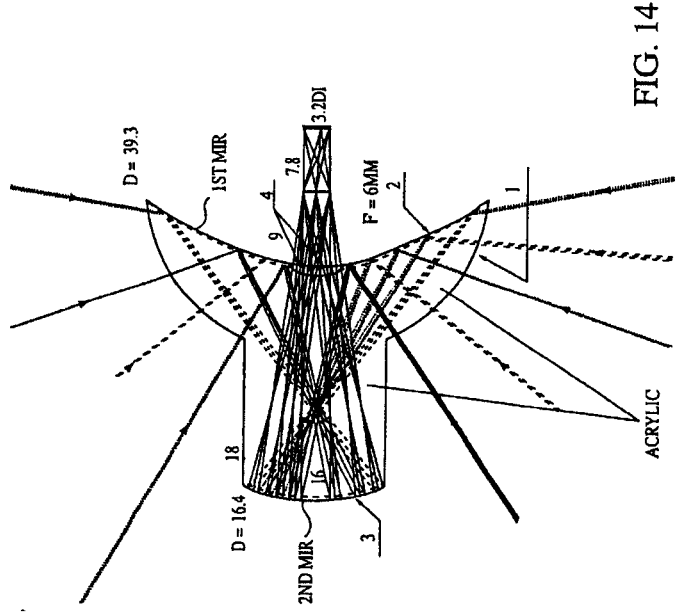

FIG. 14

UNITED STATES PATENT AND TRADEMARK OFFICE
CERTIFICATE OF CORRECTION

PATENT NO.         : 6,611,282 B1                                        Page 10 of 14
APPLICATION NO. : 09/477415
DATED                  : August 26, 2003
INVENTOR(S)       : Sergey Trubko et al.

It is certified that error appears in the above-identified patent and that said Letters Patent is hereby corrected as shown below:

In drawings, Sheet 15 of 22, dotted line paralleling surface 2 should be deleted from central area defined by rays that are entering the 3.2C area where they intersect surface 2.

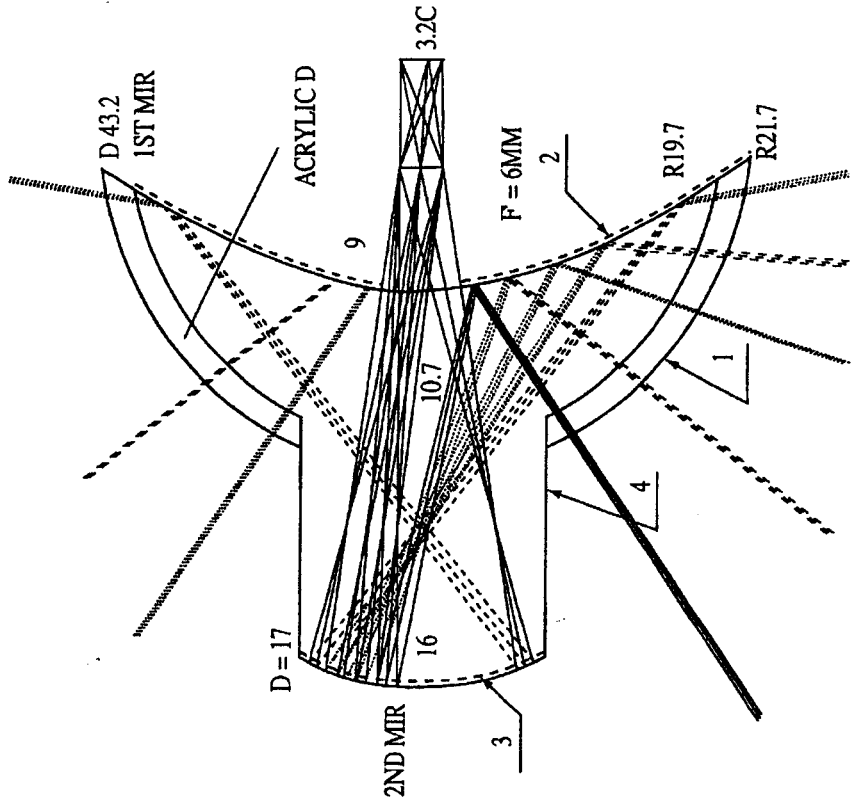

FIG. 15

UNITED STATES PATENT AND TRADEMARK OFFICE
CERTIFICATE OF CORRECTION

| | | |
|---|---|---|
| PATENT NO. | : 6,611,282 B1 | |
| APPLICATION NO. | : 09/477415 | |
| DATED | : August 26, 2003 | |
| INVENTOR(S) | : Sergey Trubko et al. | |

It is certified that error appears in the above-identified patent and that said Letters Patent is hereby corrected as shown below:

In the drawings, Sheet 16 of 22, reference character "$\alpha$" applied to angle between line $I_2$ and dotted line should read --$\beta$--.
Character "$\beta$" applied to angle between line $I_3$ and dotted line should read --$\alpha$--.
Reference character "$R_1$" should be added to area beneath the intersection of line $I_3$ and the dotted line.

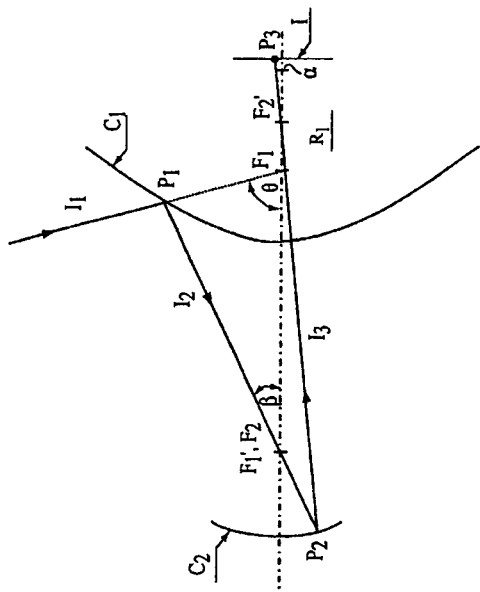

FIG. 16

UNITED STATES PATENT AND TRADEMARK OFFICE
CERTIFICATE OF CORRECTION

| | | |
|---|---|---|
| PATENT NO. | : 6,611,282 B1 | Page 12 of 14 |
| APPLICATION NO. | : 09/477415 | |
| DATED | : August 26, 2003 | |
| INVENTOR(S) | : Sergey Trubko et al. | |

It is certified that error appears in the above-identified patent and that said Letters Patent is hereby corrected as shown below:

In the drawings, Sheet 17 of 22, phrase "2ND REFRACTIVE (BACK) SURFACE" applied to the 1st Mirror, should read --2ND REFLECTIVE (BACK) SURFACE--. Applied to 2nd Mirror, "3RD REFRACTIVE SURFACE" should read --3RD REFLECTIVE SURFACE--.

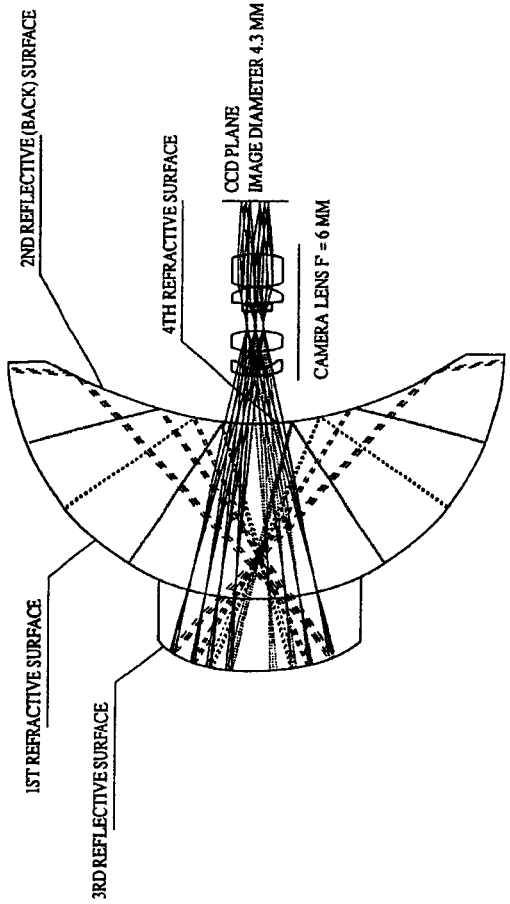

FIG. 17

UNITED STATES PATENT AND TRADEMARK OFFICE
CERTIFICATE OF CORRECTION

PATENT NO.       : 6,611,282 B1
APPLICATION NO. : 09/477415
DATED            : August 26, 2003
INVENTOR(S)      : Sergey Trubko et al.

It is certified that error appears in the above-identified patent and that said Letters Patent is hereby corrected as shown below:

Column 1, line 17 "1800" should read --180°--.

Equation (5) in column 12, lines 21-23 " $\tan\beta = \dfrac{(1+k_1)\sin\theta}{2\sqrt{-k_1} + (1-k_1)\cos\theta}$ " should read -- $\tan\beta = \dfrac{(1+k_1)\sin\theta}{2\sqrt{-k_1} + (1-k_1)\cos\theta}$ --.

Equation (6) in column 12, lines 24-26 " $\tan\alpha = \dfrac{(1+k_2)\sin\beta}{2\sqrt{-k_2} + (1-k_2)\cos\beta}$ " should read -- $\tan\alpha = \dfrac{(1+k_2)\sin\beta}{2\sqrt{-k_2} + (1-k_2)\cos\beta}$ --.

Signed and Sealed this

Thirty-first Day of October, 2006

JON W. DUDAS
*Director of the United States Patent and Trademark Office*

United States Patent
Trubko et al.

(10) Patent No.: US 6,611,282 B1
(45) Date of Patent: Aug. 26, 2003

(54) SUPER WIDE-ANGLE PANORAMIC IMAGING APPARATUS

(75) Inventors: Sergey Trubko, Floral Park, NY (US); Venkata N. Peri, Jersey City, NJ (US); Shree K. Nayar, New York, NY (US); James Korein, Chappaqua, NY (US)

(73) Assignee: Remote Reality, Westborough, MA (US)

( * ) Notice: Subject to any disclaimer, the term of this patent is extended or adjusted under 35 U.S.C. 154(b) by 0 days.

(21) Appl. No.: 09/477,415

(22) Filed: Jan. 4, 2000

Related U.S. Application Data

(60) Provisional application No. 60/114,702, filed on Jan. 4, 1999.

(51) Int. Cl.[7] .......................... H04N 7/00; G02B 23/00; G02B 17/00
(52) U.S. Cl. ........................................ 348/36
(58) Field of Search ...................... 348/36, 37, 335, 348/373; 359/725, 366, 729, 859, 731; 434/44

(56) References Cited

U.S. PATENT DOCUMENTS

| | | | |
|---|---|---|---|
| 3,505,465 A | | 4/1970 | Rees .......................... 178/6 |
| 4,100,571 A | * | 7/1978 | Dykes et al. .................. 348/37 |
| 4,297,723 A | * | 10/1981 | Whitby .......................... 348/36 |
| 4,395,093 A | | 7/1983 | Rosendahl ...................... 350/441 |
| 4,484,801 A | | 11/1984 | Cox .............................. 350/441 |
| 4,556,763 A | | 12/1985 | Dragunevicius et al. ..... 179/164 |
| 4,566,763 A | * | 1/1986 | Greguss ........................ 359/725 |
| 5,185,667 A | | 2/1993 | Zimmermann ............... 358/209 |
| 5,359,363 A | | 10/1994 | Kuban et al. .................. 348/36 |
| 5,627,675 A | * | 5/1997 | Davis et al. ................. 359/366 |
| 5,631,778 A | | 5/1997 | Powell ......................... 359/724 |
| 5,760,826 A | | 6/1998 | Nayar .......................... 348/36 |
| 6,118,474 A | * | 9/2000 | Nayar .......................... 348/36 |
| 6,226,035 B1 | * | 5/2001 | Korein et al. ................ 348/335 |
| 6,449,103 B1 | * | 9/2002 | Charles ........................ 359/725 |

FOREIGN PATENT DOCUMENTS

WO    WO 97/50252    12/1997

OTHER PUBLICATIONS

Hall et al., "Omnidirectional viewing using a fish eye lens"; SPIE vol. 728 Optics, Illumination, and Image Sensing for Machine Vision (1986), pp. 250.

Drucker et al., "A Natural Classification of Curves and Surfaces With Reflection Properties"; Mathematics Magazine, vol. 69, No. 4, Oct. 1996, pp. 249–256.

V.N. Mahajan, Optical Imaging and Aberrations, SPIE Press, 1998, pp. 375.

(List continued on next page.)

*Primary Examiner*—Gims S. Philippe
(74) *Attorney, Agent, or Firm*—Katten Muchin Zavis Rosenman; Gilberto M. Villacorta; Andrew J. Bateman

(57) ABSTRACT

A system for capturing super wide-angle panoramic images. In particular, a two-reflector system is disclosed which is substantially self-correcting in which optical aberrations are substantially eliminated, such as field curvature, astigmatism and the like. Moreover, the super wide-angle panoramic imaging apparatus of the invention captures a super-wide field of view from a substantially single reference viewpoint. The invention provides a substantially compact viewpoint, while also having a substantially flat and stigmatic image plane, in the context of a super wide-angle panoramic system. Devices and methods for capturing panoramic images of super wide-angle scenes are provided. In a particular embodiment of the invention, two reflectors are provided (e.g., one a hyperboloidal mirror, the other a concave ellipsoidal or spherical mirror), a relay system (e.g., optics such as a mirror, a lens, a pinhole and the like) and an image sensor (e.g., an electronic photo-sensor, a film and the like).

40 Claims, 22 Drawing Sheets

OTHER PUBLICATIONS